(12) United States Patent
Tiwari et al.

(10) Patent No.: US 12,555,229 B2
(45) Date of Patent: Feb. 17, 2026

(54) HIERARCHICAL DEEP LEARNING APPROACH FOR SEGMENTATION OF GLIOBLASTOMA TUMOR NICHES ON DIGITAL HISTOPATHOLOGY

(71) Applicant: Case Western Reserve University, Cleveland, OH (US)

(72) Inventors: Pallavi Tiwari, Wexford, PA (US); Alvaro Andres Sandino Garzon, Madison, WI (US); Eduardo Romero, Bogotá (CO)

(73) Assignee: Case Western Reserve University, Cleveland, OH (US)

( * ) Notice: Subject to any disclaimer, the term of this patent is extended or adjusted under 35 U.S.C. 154(b) by 476 days.

(21) Appl. No.: 18/166,030

(22) Filed: Feb. 8, 2023

(65) Prior Publication Data
US 2023/0267606 A1 Aug. 24, 2023

Related U.S. Application Data

(60) Provisional application No. 63/312,407, filed on Feb. 22, 2022.

(51) Int. Cl.
| | | |
|---|---|---|
| *G06T 7/00* | (2017.01) | |
| *G06T 3/40* | (2006.01) | |
| *G06T 7/11* | (2017.01) | |
| *G06V 10/25* | (2022.01) | |
| *G06V 10/56* | (2022.01) | |

(52) U.S. Cl.
CPC .............. *G06T 7/0012* (2013.01); *G06T 3/40* (2013.01); *G06T 7/11* (2017.01); *G06V 10/25* (2022.01); *G06V 10/56* (2022.01); *G06T 2207/10024* (2013.01); *G06T 2207/30096* (2013.01); *G06T 2207/30101* (2013.01)

(58) Field of Classification Search
CPC . G06T 7/0012; G06T 3/40; G06T 7/11; G06T 2207/10024; G06T 2207/30096; G06T 2207/30101; G06T 2207/20081; G06T 2207/20084; G06T 7/90; G06T 2207/10056; G06T 2207/30024; G06V 10/25; G06V 10/56; G06V 10/26; G06V 10/82; G06V 2201/03
USPC .......................................... 382/128
See application file for complete search history.

(56) References Cited

U.S. PATENT DOCUMENTS 10,614,567 B2 * 4/2020 Tiwari ................ A61B 5/0042
2022/0172359 A1 * 6/2022 Fathallah-Shaykh ..... G06T 7/62

* cited by examiner

*Primary Examiner* — Neil R Mclean
(74) *Attorney, Agent, or Firm* — Eschweiler & Potashnik, LLC

(57) ABSTRACT

In some embodiments, the present disclosure relates to a method for generating a prognosis. The method may be performed by providing one or more digitized biopsy images of a patient having a glioma. One or more necrotic regions and one or more non-necrotic regions are identified within the one or more digitized biopsy images using a first deep learning algorithm. A second deep learning algorithm is applied to the one or more non-necrotic regions to identify glioblastoma multiforme (GBM) histopathological indicators within the one or more non-necrotic regions.

20 Claims, 15 Drawing Sheets

HIERARCHICAL DEEP LEARNING APPROACH FOR SEGMENTATION OF GLIOBLASTOMA TUMOR NICHES ON DIGITAL HISTOPATHOLOGY

REFERENCE TO RELATED APPLICATION

This application claims the benefit of U.S. Provisional Application No. 63/312,407, filed on Feb. 22, 2022, the contents of which are hereby incorporated by reference in their entirety.

BACKGROUND

Glioblastoma is an aggressive type of cancer that can occur in the brain and/or spinal cord. Glioblastoma is a glial cell tumor that develops from connective tissue cells called astrocytes. Glioblastoma, also known as glioblastoma multiforme, can be very difficult to treat and a cure is often not possible. However, treatments may slow progression of the cancer and reduce signs and symptoms.

BRIEF DESCRIPTION OF THE DRAWINGS

The accompanying drawings, which are incorporated in and constitute a part of the specification, illustrate various example operations, apparatus, methods, and other example embodiments of various aspects discussed herein. It will be appreciated that the illustrated element boundaries (e.g., boxes, groups of boxes, or other shapes) in the figures represent one example of the boundaries. One of ordinary skill in the art will appreciate that, in some examples, one element can be designed as multiple elements or that multiple elements can be designed as one element. In some examples, an element shown as an internal component of another element may be implemented as an external component and vice versa. Furthermore, elements may not be drawn to scale.

DETAILED DESCRIPTION

Figure 1:
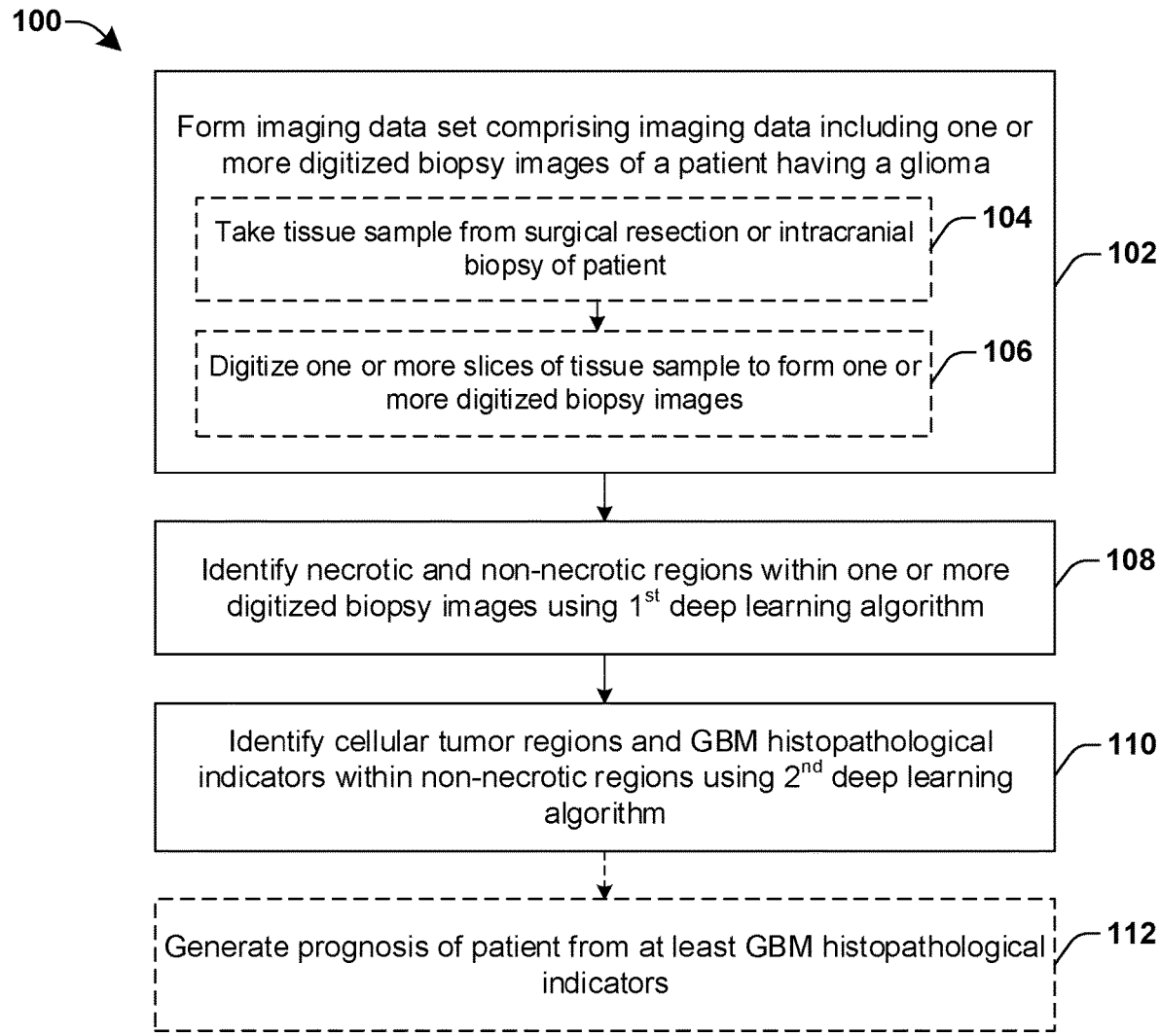
FIG. 1 illustrates a flow diagram of some embodiments of a method of using a plurality deep learning algorithms to generate a prognosis for a patient from glioblastoma multiforme (GBM) histopathological indicators within non-necrotic regions of a glioma.

The description herein is made with reference to the drawings, wherein like reference numerals are generally utilized to refer to like elements throughout, and wherein the various structures are not necessarily drawn to scale. In the following description, for purposes of explanation, numerous specific details are set forth in order to facilitate understanding. It may be evident, however, to one of ordinary skill in the art, that one or more aspects described herein may be practiced with a lesser degree of these specific details. In other instances, known structures and devices are shown in block diagram form to facilitate understanding.

A glioma is a type of brain tumor that originates from glial cells in a brain. There are different grades of gliomas, indicating their growth potential and aggressiveness. High-grade gliomas, called glioblastoma multiforme (GBM), are one of the most aggressive forms of cancer, having a median survival of between 12 months and 15 months. The current standard-of-care for GBM consists of surgical resection followed by radiation and chemotherapy. Because morphological information captured from cellular regions on surgically resected histopathology slides has the ability to reveal the inherent heterogeneity in GBM, diagnosis of GBM may be based on histopathology confirmation via tissue samples obtained from surgical resection or intracranial biopsies (e.g., in difficult to resect tumors). Therefore, following surgical resection, a Hematoxylin and Eosin (H&E) stained tissue slide may be formed. Examination of the structure and/or morphology of the H&E slide may be subsequently performed by a neuropathologist for confirmation of a GBM diagnosis.

The visual examination of the structure and/or morphology of an H&E slide tries to identify GBM hallmarks that may indicate a nature of a tumor. For example, microvascular proliferation and pseudopalisading cells are histopathological features of interest to distinguish high-grade gliomas (e.g., such as GBM) from lower-grade gliomas. However, many technical challenges hinder visual differentiation between different tissue types, such as a complexity in tissue features, heterogeneity in images, and/or a large size of a whole slide image. For example, given the vastly heterogenous GBM histopathology, qualitative assessment may be difficult due to variability and inconsistencies introduced by tissue preparation and staining protocols. Furthermore, qualitative assessment is time consuming and suffers from discordance in interpretation between different neuropathologists. Additionally, studies have shown that GBMs can be histologically under-graded due to sampling errors associated with the amount of viable tissue present on small tissue sections on H&E stained slides.

The present disclosure relates to a method and/or apparatus for generating a prognosis for a patient having a glioma. The method includes generating a digitized biopsy image (e.g., a digitized H&E stained slide) for a patient having a glioma. A first deep learning algorithm is configured to operate upon the digitized biopsy image to identify necrotic and non-necrotic regions. A second deep learning algorithm is configured to operate upon the non-necrotic regions to identify cellular tumor regions and GBM histopathological indicators (e.g., microvascular proliferation regions, hyperplastic blood vessel regions, pseudopalisading cell regions, or the like) within the non-necrotic regions. A prognosis for the patient is generated from at least the GBM histopathological indicators. Considering that the visual analysis of a digitized biopsy image is subjective, time consuming, and requires significant neuropathology expertise, the disclosed method can reduce the time and costs associated with analyzing the digitized biopsy image. Therefore, the disclosed method may be a useful tool for annotating large digitized biopsy image, as well as building downstream prognostic models for gliomas.

FIG. 1 illustrates a flow diagram of some embodiments of a method 100 of using a plurality deep learning algorithms to generate a prognosis for a patient from glioblastoma multiforme (GBM) histopathological indicators within non-necrotic regions of a glioma.

While the disclosed methods (e.g., methods 100, 400, 1000, and/or 1100) are illustrated and described herein as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

At act 102, an imaging data set is formed to comprise imaging data including one or more digitized biopsy images of a patient having a glioma (e.g., Glioblastoma Multiforme (GBM)). In some embodiments, the imaging data set may be formed by taking a tissue sample from a surgical resection or intracranial biopsy of a patient (at act 104) and then digitizing one or more slices of the tissue sample to form the digitized biopsy images (at act 106).

At act 108, necrotic and non-necrotic regions are identified within the one or more digitized biopsy images using a first deep learning algorithm. In some embodiments, the non-necrotic regions may comprise regions identified by the first deep learning algorithm as cellular tumor regions.

At act 110, GBM histopathological indicators and cellular tumor regions are identified within the non-necrotic regions using a second deep learning algorithm. In some embodiments, the GBM histopathological indicators may comprise one or more of microvascular proliferation regions, hyperplastic blood vessel regions, pseudopalisading cell regions, and/or the like.

At act 112, a prognosis of the patient may be generated from at least the GBM histopathological indicators in some embodiments. In some embodiments, the prognosis may be generated by also taking into consideration the necrotic regions and/or the cellular tumor regions.

Therefore, the disclosed method 100 utilizes multiple deep learning algorithms in a hierarchical segmentation approach to identify GBM histopathological indicators. The hierarchical approach allows for different deep learning algorithms to be trained to more accurately differentiate between different tissue types within a heterogeneous and complex microtumor microenvironment of a glioma. Furthermore, considering that visual analysis of digitized biopsy images (e.g., whole slide images of H&E stained glioma tumor slides) is highly subjective, time consuming, and requires significant neuropathology expertise, the disclosed method 100 is able to segment of tumor tissue in a manner that reduces a time and cost of the analysis. The disclosed method therefore provides health care professionals with a useful tool for annotating large whole-slide images and for improving a quality of care for patients having GBM. Furthermore, it could help pathologist to understand the tumoral microenvironment and its mechanisms which give rise to the rapid growth of tumor cells for invading healthy brain tissue, thereby helping to building downstream prognostic models for improved glioma prognosis and/or treatment options.

Figure 2:
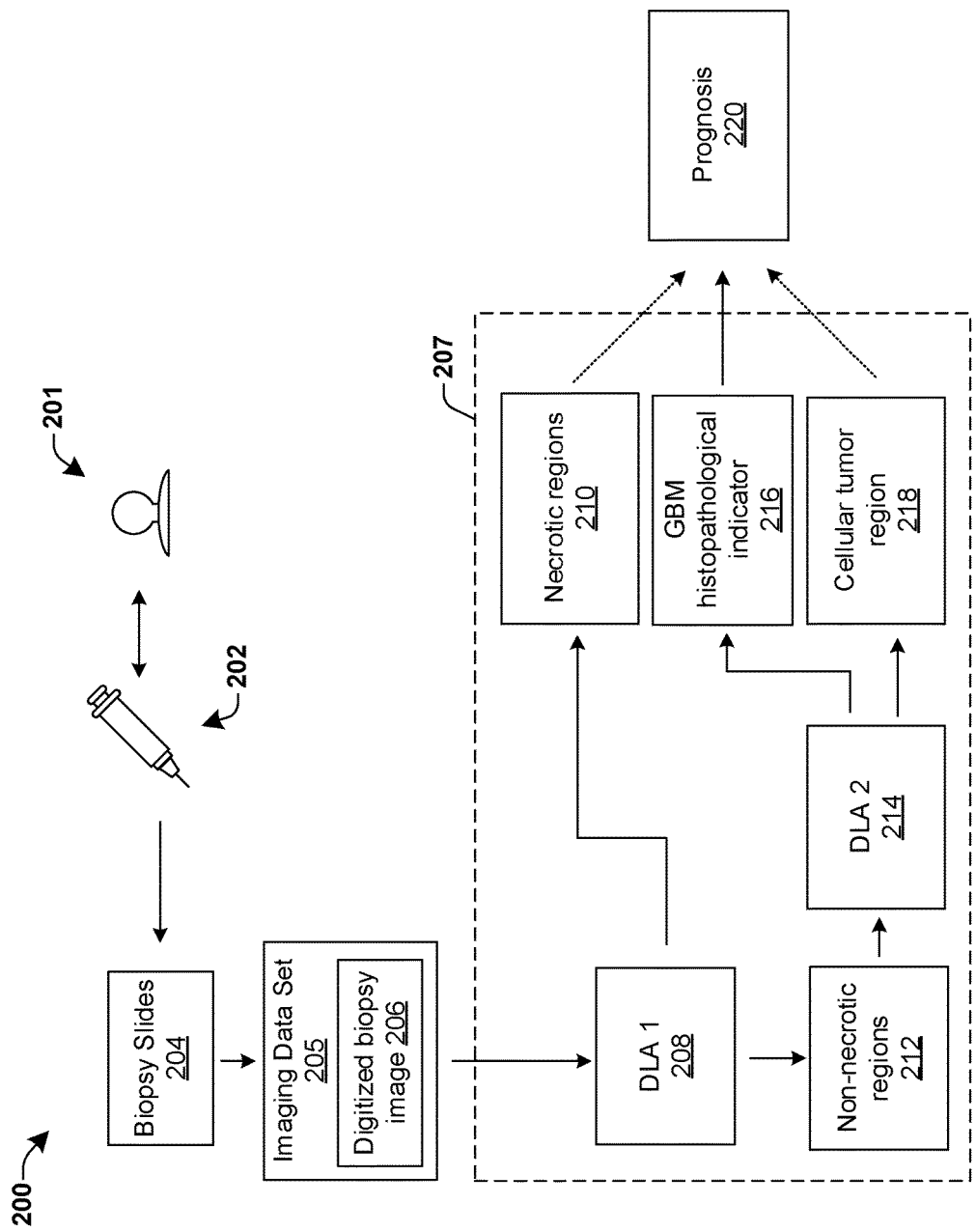
FIG. 2 illustrates a block diagram showing some embodiments corresponding to a prognostic apparatus and/or method that uses a deep learning system having a plurality deep learning algorithms configured to generate a prognosis from GBM histopathological indicators within non-necrotic regions of a glioma.

FIG. 2 illustrates a block diagram 200 showing some embodiments corresponding to a prognostic apparatus and/or method that uses a deep learning system comprising a plurality deep learning algorithms to generate a prognosis from GBM histopathological indicators within non-necrotic regions of a glioma.

As shown in block diagram 200, an imaging data set 205 is formed. The imaging data set 205 comprises imaging data for a patient 201 having a glioma. In some embodiments, the imaging data set 205 comprises a digitized biopsy image 206 (e.g., a digitized biopsy slide) obtained from a pathological tissue sample taken from the patient 201. In some such embodiments, a tissue sample collection tool 202 is used to perform a biopsy on the patient 201 to obtain a tissue block. The tissue block is sliced into thin slices that are placed on one or more transparent slides (e.g., one or more glass slides). The tissue on the one or more transparent slides is then stained to generate one or more biopsy slides 204. The one or more biopsy slides 204 are subsequently converted to a plurality of whole slide images (WSIs) comprising the digitized biopsy image 206. In some embodiments, the digitized biopsy image 206 may comprise a digitized H&E (Hematoxylin and Eosin) stained slide.

A deep learning system 207 comprising a plurality of deep learning algorithms 208, 214 is configured to access the imaging data set 205. The deep learning system 207 is further configured to identify GBM histopathological indicators within non-necrotic regions of a glioma (e.g., a GBM tumor) within the digitized biopsy image 206. In some embodiments, the deep learning system 207 may also generate a prognosis 220 from the GBM histopathological indicators. In some embodiments, the deep learning system 207 comprises a first deep learning algorithm 208 and a second deep learning algorithm 214 downstream of the first deep learning algorithm 208.

The first deep learning algorithm 208 is configured to identify one or more necrotic regions 210 and one or more non-necrotic regions 212 within the digitized biopsy image 206. For example, the first deep learning algorithm 208 may be configured to segment the digitized biopsy image 206 into one or more necrotic regions 210 and one or more non-necrotic regions 212. A texture of the non-necrotic regions 212 is extremely heterogeneous and it may be difficult for the first deep learning algorithm 208 to accurately identify different components (e.g., different GM indicators) within the one or more non-necrotic regions 212. In some embodiments, due to the heterogeneity of the one or more non-necrotic regions 212, the first deep learning algorithm 208 may identify the one or more non-necrotic regions 212 as cellular tumor regions (e.g., intermediate cellular tumor regions). In some embodiments, the first deep learning algorithm 208 may comprise a first convolutional neural network (CNN) (e.g., a first hierarchical CNN). In some embodiments, the first CNN may have a ResNET-50 architecture. In some other embodiments, the first CNN may have an EfficientNET based architecture (e.g., an EfficientNet B0 model (EffB0)).

The second deep learning algorithm 214 is configured to identify one or more GBM histopathological indicators 216 within the one or more non-necrotic regions 212. For example, the second deep learning algorithm 214 may be configured to segment the one or more non-necrotic regions 212 into one or more GBM histopathological indicators 216 and one or more cellular tumor regions 218. In some embodiments, the one or more GBM histopathological indicators 216 may comprise one or more of microvascular proliferation regions, hyperplastic blood vessel (HBV) regions, pseudopalisading cell regions, or the like. In some embodiments, HBV in GBM may be identified as regions in which a density of blood vessels that have thickened walls (e.g., endothelial cell proliferation) exceeds a second threshold. In some embodiments, the second deep learning algorithm 214 may comprise a second CNN (e.g., a second hierarchical CNN). In some embodiments, the second CNN may have a ResNET-50 architecture. In some additional embodiments, the second CNN may have a U-Net based architecture. In some additional embodiments, the second CNN may have an EfficientNet-UNet based architecture.

In some embodiments, a prognosis 220 of the patient 201 is generated from at least the one or more GBM histopathological indicators 216. In some embodiments, the prognosis 220 may be generated by also taking into consideration the necrotic regions 210 (e.g., because rapidly growing tumor cells outgrow a limited oxygen supply resulting in tumor necrosis, necrosis is a GBM hallmark associated with tumor aggressiveness and poor outcome) and/or the cellular tumor regions 218. In various embodiments, the prognosis 220 may be generated by a health care professional or by a machine learning model. The prognosis 220 may comprise a tumor grade, a survival time (e.g., a mean survival time, a median survival time, etc.), or the like. For example, the prognosis 220 may identify a glioma within the digitized biopsy image 206 as a low-grade glioma (e.g., a tumor having a grade I or grade II) or a high-grade glioma (e.g., a grade III or grade IV glioblastoma).

FIGS. 3A-3D illustrate some exemplary digitized images of H&E stained slides corresponding to different types of glioma tissue.

Figure 3A:
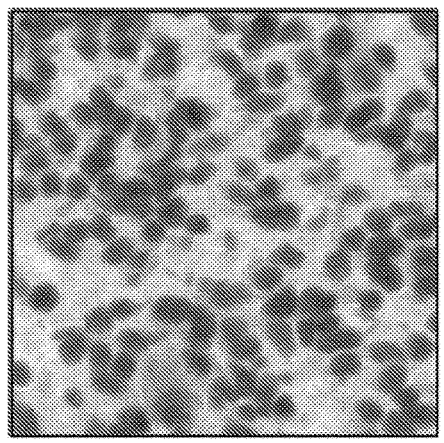
FIGS. 3A-3D illustrate some exemplary digitized images of H&E stained slides corresponding to different types of glioma tissue.

Slide 300 of FIG. 3A illustrates a digitized image corresponding to cellular tumor region. As can be seen in slide 300, cellular tumor regions can be described as regions with cellular densities exceeding a first threshold corresponding to typical levels of cells per area.

Figure 3B:
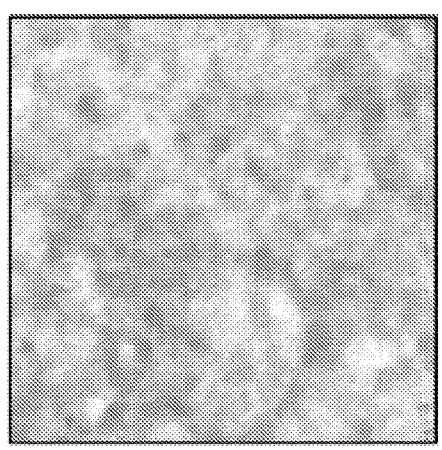

Slide 302 of FIG. 3B illustrates a digitized image corresponding to a necrotic region. As can be seen in slide 302, necrosis can be identified as an area with a poor-population of nuclei including disintegrating nuclei (e.g., nuclei having a fragmented or poor boundary area).

Figure 3C:
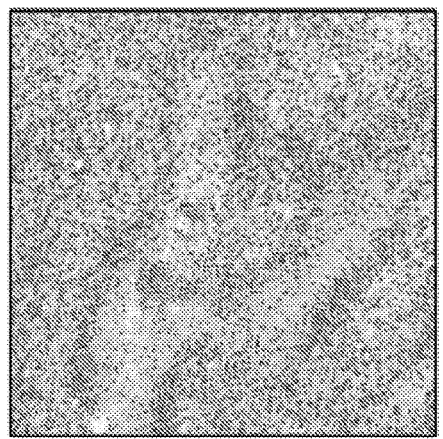

Slide 304 of FIG. 3C illustrates a digitized image corresponding to a pseudopalisading cell region. The presence of pseudopalisading cells in gliomas is a prognostic feature which implies aggressive tumor behavior. Pseudopalisading cells within the pseudopalisading cell region may have a pattern resembling a protective layer similar to a fence. In some embodiments, pseudopalisading cell regions can be identified by densely-grouped cells that surround necrotic areas (e.g., necrotic foci) comprising a plurality of thrombosed vessels. This local arrangement may represent a massive cells migration away from a low-nutrient and low-oxygen microenvironment (e.g., hypoxic centers of necrosis).

Figure 3D:
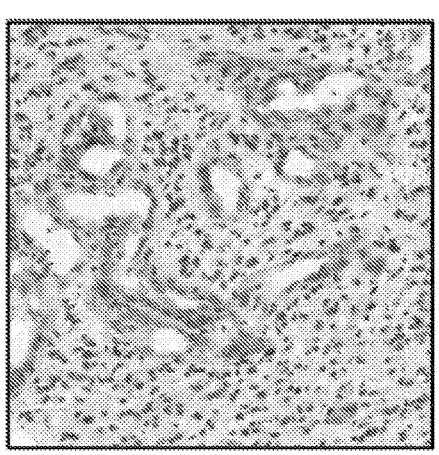

Slide 306 of FIG. 3D illustrates a digitized image corresponding to a microvascular proliferation region. Because GBM is a highly vascularized tumor that requires blood supply mechanisms for growth, progression, and establishment, microvascular proliferation regions are a hallmark of GBM. Therefore, the presence of microvascular proliferations in brain malignancies are one of the main morphological features for GBM diagnosis. Generally, a microvascular proliferation can be identified by two or more blood vessels sharing a common vessel wall of endothelial cells usually with a glomeruloid appearance. Because the interactions between tumor cells and blood vessels during microvascular proliferation seem to facilitate tumor growth, microvascular proliferations are frequently found in areas adjacent infiltrating edge and necrotic areas.

It will be appreciated that the disclosed methods and/or block diagrams may be implemented as computer-executable instructions, in some embodiments. Thus, in one example, a computer-readable storage device (e.g., a non-transitory computer-readable medium) may store computer executable instructions that if executed by a machine (e.g., computer, processor) cause the machine to perform the disclosed methods and/or block diagrams. While executable instructions associated with the disclosed methods and/or block diagrams are described as being stored on a computer-readable storage device, it is to be appreciated that executable instructions associated with other example disclosed methods and/or block diagrams described or claimed herein may also be stored on a computer-readable storage device.

Figure 4:
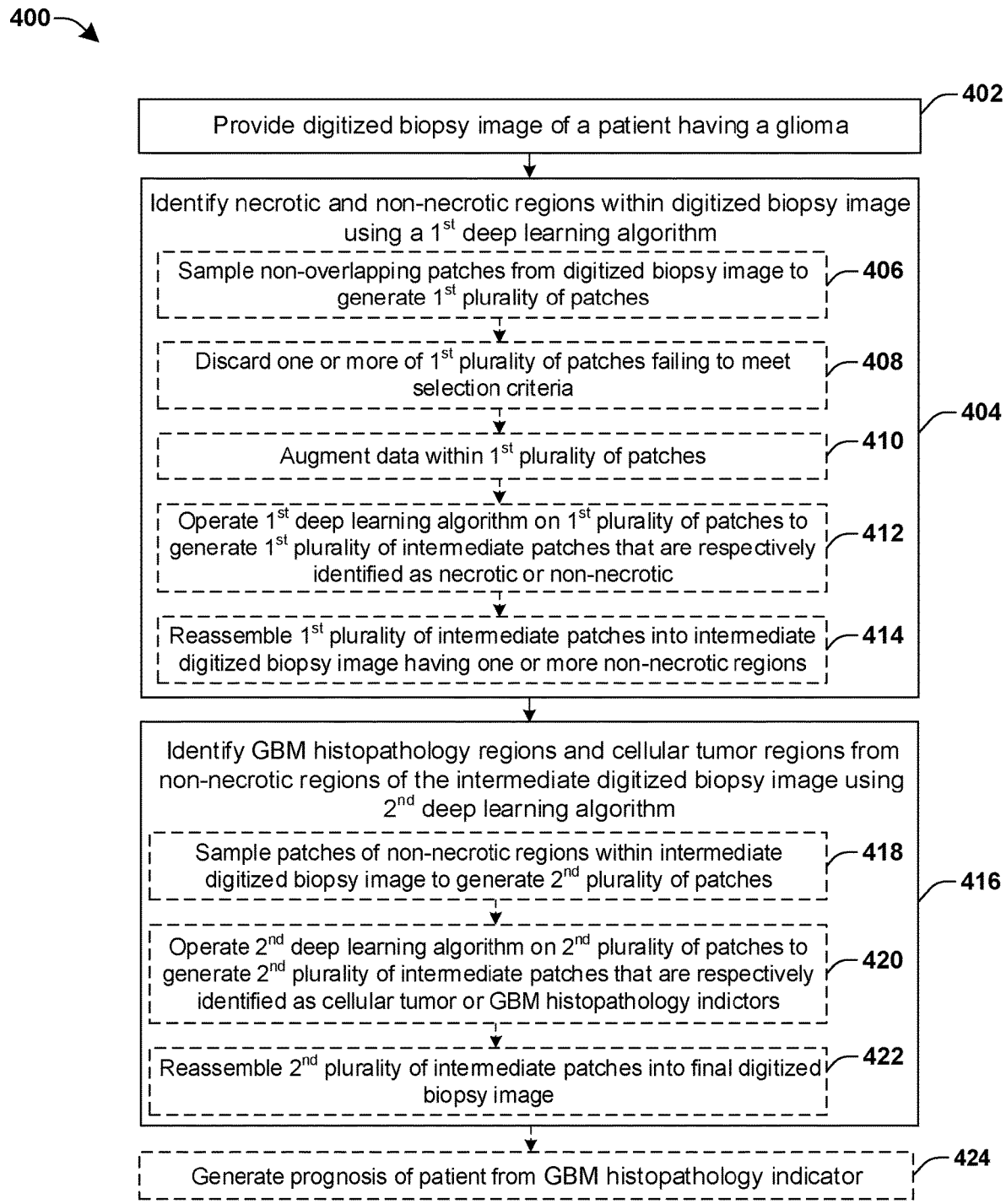
FIG. 4 illustrates a flow diagram of some additional embodiments of a method of using a plurality deep learning algorithms to generate a prognosis for a patient from GBM histopathological indicators within non-necrotic regions of a glioma.

FIG. 4 illustrates a flow diagram of some additional embodiments of a method 400 of using a plurality deep learning algorithms to generate a prognosis for a patient from GBM histopathological indicators within non-necrotic regions of a glioma.

At act 402, a digitized biopsy image (e.g., a digitized biopsy slide, a whole slide image (WSI), or the like) of a patient having a glioma is provided.

At act 404, necrotic and non-necrotic regions are identified within the digitized biopsy image using a first deep learning algorithm. In some embodiments, the necrotic and non-necrotic regions may be identified within the digitized biopsy image according to acts 406-414.

At act 406, a plurality of non-overlapping patches are sampled from the digitized biopsy image to generate a first plurality of patches. In some embodiments, the first plurality of patches may respectively have a first size (e.g., a first number of pixels or voxels).

At act 408, one or more of the first plurality of patches are discarded for failing to meet one or more selection criteria. In some embodiments, one or more patches of the first plurality of patches that have less than 75% tissue sections are discarded. In some additional embodiments, one or more patches of the first plurality of patches may be discarded if they have improper tissue placement, pen marking, bubbles, reagents, poor microtomy, and/or the like.

At act 410, data within one or more of the first plurality of patches is augmented. In various embodiments, data within the one or more of the first plurality of patches may be augmented using augmentation techniques including horizontal flips, vertical flips, random shifts, color transformations, and/or random rotations. Augmentation of the data within the one or more of the first plurality of patches improves a performance of subsequent deep learning algorithms.

At act 412, a first deep learning algorithm is operated upon the first plurality of patches to generate a first plurality of intermediate patches that are respectively identified as necrotic or non-necrotic. The first deep learning model is configured to operate upon the first plurality of patches in a patch-wise manner to classify individual patches as necrotic or non-necrotic.

At act 414, the first plurality of intermediate patches are reassembled into an intermediate digitized biopsy image (e.g., an intermediate whole slide image) having one or more non-necrotic regions. In some embodiments, the intermediate digitized biopsy image may also comprise one or more necrotic regions.

At act 416, GBM histopathology indicators and one or more cellular tumor regions are identified from the one or more non-necrotic regions of the intermediate digitized biopsy image using a second deep learning algorithm. In some embodiments, the GBM histopathology indicators and one or more cellular tumor regions may be identified according to acts 418-422.

At act 418, a plurality of non-overlapping patches are sampled from the intermediate digitized biopsy image to generate a second plurality of patches. In some embodiments, the second plurality of patches may respectively have a second size (e.g., a second number of pixels or voxels) that is larger than the first size.

At act 420, a second deep learning algorithm is operated upon the second plurality of patches to generate a second plurality of intermediate patches that are respectively identified as a cellular tumor or a GBM histopathology indicator (e.g., a microvascular proliferation region, a hyperplastic blood vessel region, pseudopalisading cell region, or the like).

At act 422, the second plurality of intermediate patches are reassembled into a final digitized biopsy image (e.g., a final whole slide image) having one or more cellular tumor regions and one or more GBM histopathology indicators.

At act 424, a prognosis for the patient may be generated from the GBM histopathological indicators in some embodiments.

Figure 5:
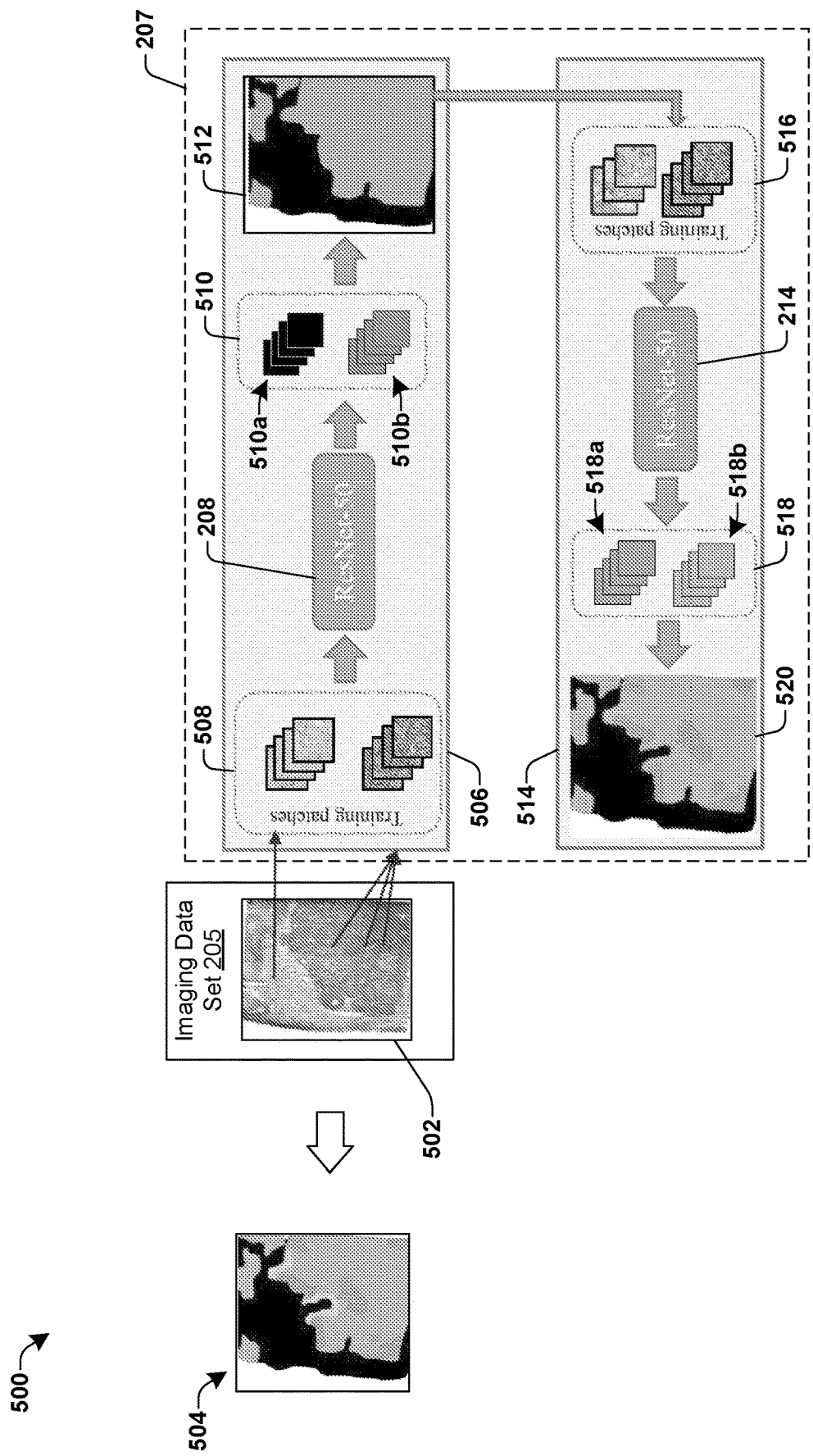
FIG. 5 illustrates a block diagram showing some embodiments of a prognostic apparatus comprising a deep learning system having a plurality deep learning algorithms configured to generate a prognosis for a patient from GBM histopathological indicators within non-necrotic regions of a glioma.

FIG. 5 illustrates a block diagram showing some embodiments of a prognostic apparatus 500 comprising a deep learning system having a plurality deep learning algorithms configured to generate a prognosis for a patient from GBM histopathological indicators within non-necrotic regions of a glioma.

The prognostic apparatus 500 is configured to operate upon an imaging data set 205 comprising a whole slide image (WSI) 502 for one or more patients having a glioma. In some embodiments, the imaging data set 205 may be formed by obtaining one or more pathological tissue samples from a patient's body, dividing the one or more pathological tissue samples into tissue blocks, which, in turn, may be divided into sub-blocks. Each sub-block may contain a whole slide image (WSI) stained with hematoxylin and Eosin (H&E). In some embodiments, the WSI 502 may be acquired at a magnification of approximately 20×, approximately 30×, approximately 50×, or other similar values. The WSI 502 may be digitized to have a JPG image format. In some embodiments, the WSI 502 may comprise a resolution of approximately 0.50 microns/pixel. In some embodiments, the WSI 502 may comprise a relatively large size (e.g., 15,000 pixels×18,000 pixels).

In some embodiments, the WSI 502 has a corresponding ground truth 504. In some embodiments, histopathologic tumor regression grade (TRG) assessment of an excised surgical specimen may be used as the ground truth 504. The ground truth 504 illustrates cellular tumor regions, necrotic regions, and hyperplastic blood vessel (HBV) regions. In some additional embodiments, the ground truth 504 may also and/or alternatively illustrate one or more of pseudopalisading cell regions and microvascular proliferation regions.

The WSI 502 is provided to a deep learning system 207 having a first deep learning stage 506 and a second deep learning stage 514. The first deep learning stage 506 comprises a first deep learning algorithm 208 configured to identify necrotic and non-necrotic regions within the WSI 502. In some embodiments, the first deep learning stage 506 is configured to sample the WSI 502 to generate a first plurality of non-overlapping patches 508. In some embodiments, the first plurality of non-overlapping patches 508 may comprise a first number of patches. In some embodiments, the first number of patches may be between approximately 100 patches and approximately 400 patches, between approximately 100 patches and 300 patches, approximately 280 patches, between approximately 5,000 patches and approximately 15,000 patches, approximately 13,000 patches, or other similar values. In some embodiments, the first plurality of non-overlapping patches 508 may respectively have a first size. In some embodiments, the first size may be equal to approximately 200×200 pixels, approximately 224×224 pixels, approximately 250×250 pixels, or other similar values. Breaking the WSI 502 into the first plurality of non-overlapping patches 508 may improve a computational efficiency of the first deep learning algorithm 208.

The first deep learning algorithm 208 is configured to individually act upon the first plurality of non-overlapping patches 508 to generate a first plurality of intermediate patches 510. The first deep learning algorithm 208 is configured to classify each of the first plurality of non-overlapping patches 508 as a necrotic patch (e.g., a patch having more necrotic tissue than cellular tumor tissue, a patch having predominately necrotic tissue, or the like) or a non-necrotic patch, so that the first plurality of intermediate patches 510 comprise a plurality of necrotic patches 510*a* and a plurality of non-necrotic patches 510*b*. In some embodiments, the non-necrotic patch may comprise a region identified as a cellular tumor region (e.g., a patch having more cellular tumor tissue than necrotic tissue, a patch having predominately cellular tumor tissue, or the like) by the first deep learning algorithm 208. In some embodiments, the first deep learning algorithm 208 may comprise a first CNN. In some embodiments, the first CNN may have a ResNET-50 architecture. In some embodiments, the first deep learning stage 506 is subsequently configured to assemble one or more of the first plurality of intermediate patches 510 to form an intermediate WSI 512 having non-necrotic regions and/or necrotic regions.

The intermediate WSI 512 is provided to the second deep learning stage 514, which comprises a second deep learning algorithm 214 configured to identify cellular tumor regions and GBM histopathological indicators (e.g., HBV regions) within the non-necrotic regions. In some embodiments, the second deep learning stage 514 is configured to sample the intermediate WSI 512 to generate a second plurality of non-overlapping patches 516. In some embodiments, the second plurality of non-overlapping patches 516 may comprise a second number of patches. In some embodiments, the second number of patches may be smaller than the first number of patches. In some embodiments, the second number of patches may be between approximately 20 patches and approximately 100 patches, between approximately 40 patches and approximately 60 patches, approximately 50 patches, between approximately 1,000 patches and approximately 5,000 patches, or other similar values.

In some embodiments, the second plurality of non-overlapping patches 516 may respectively have a second size. In some embodiments, the second size may be larger than the first size. In some embodiments, the second size may be between approximately 250% and approximately 1,000% larger than the first size. In some embodiments, the second size may be equal to approximately 750×750 pixels, approximately 896×896 pixels, approximately 1,792×1,792 pixels, or other similar values. Forming the second plurality of non-overlapping patches 516 to have the second size that is larger than the first size allows for a region surrounding a GMB indicator (e.g., an HBV region) to be taken into consideration by the second deep learning stage 514. It has been appreciated that the region surrounding a GMB indicator (e.g., an HBV region) comprises contextual information that is useful in differentiating between a cellular tumor region and the GMB indicator.

The second deep learning algorithm 214 is configured to individually act upon the second plurality of non-overlapping patches 516 to generate a second plurality of intermediate patches 518. The second deep learning algorithm 214 may be configured to classify each of the second plurality of non-overlapping patches 516 as a cellular tumor patch (e.g., a patch having more cellular tumor tissue than HBV tissue, a patch having predominately cellular tumor tissue, or the like) or as GBM histopathological indicator patch (e.g., a patch having more HBV tissue than cellular tumor tissue, a patch having predominately HBV tissue, or the like), so that the second plurality of intermediate patches 518 comprise a plurality of cellular tumor patches 518a and a plurality of GBM histopathological indicator patches 518b. In some embodiments, the second deep learning algorithm 214 may comprise a second CNN. In some embodiments, the second CNN may have a ResNET-50 architecture.

The second deep learning stage 514 may be subsequently configured to assemble the plurality of necrotic patches 510a, the plurality of cellular tumor patches 518a, and the plurality of GBM histopathological indicator patches 518b to form a final WSI 520 having cellular tumor regions, necrotic regions, and GBM histopathological indicators. In some embodiments, the prognostic apparatus 500 may comprise a display unit (not shown) configured to display the final WSI 520 on a screen. In some embodiments, the final WSI 520 may be compared to the ground truth 504 to determine an accuracy of the prognostic apparatus 500.

Figure 6A:
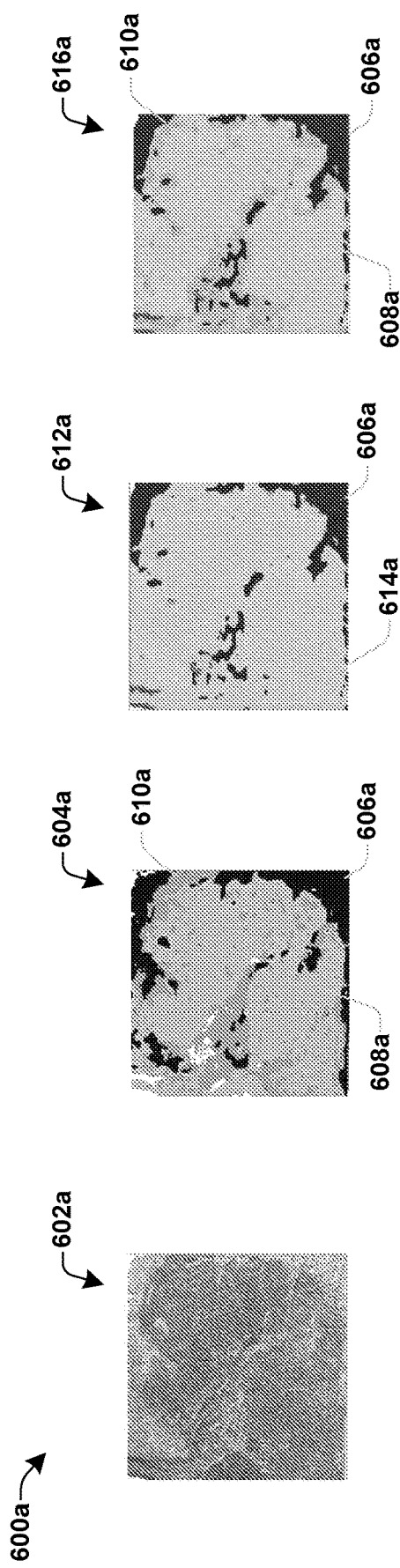
FIGS. 6A-6C illustrates exemplary images corresponding to a disclosed method and/or apparatus that uses a plurality of deep learning algorithms to identify GBM histopathological indicators within non-necrotic regions of a glioma.
Figure 6B:
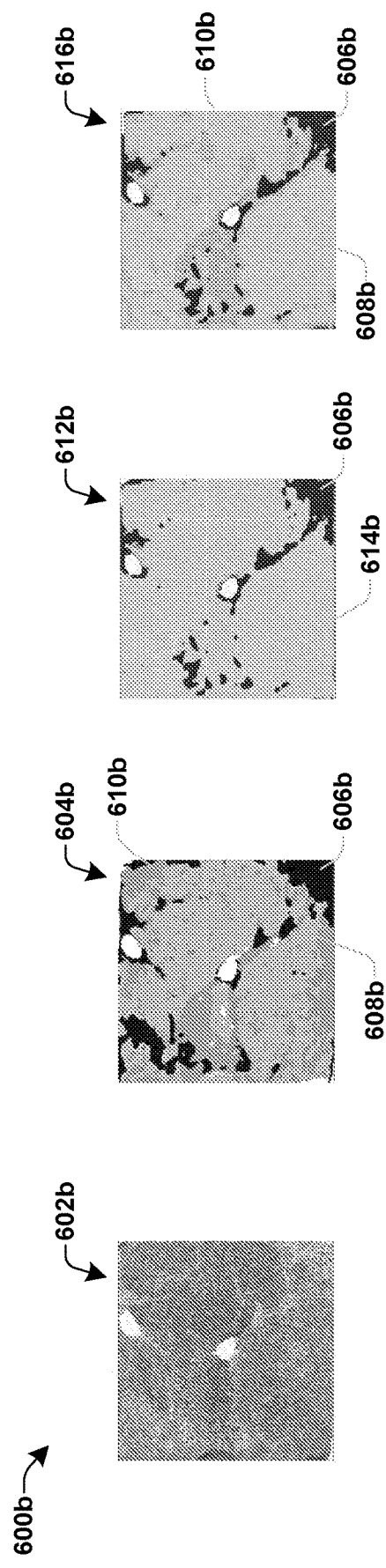
Figure 6C:
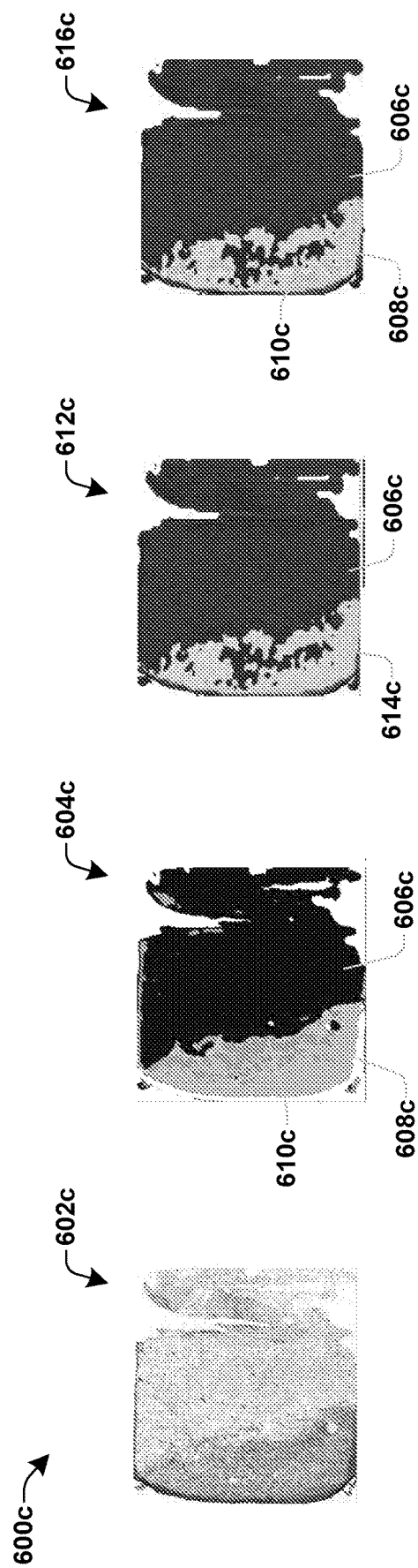

FIGS. 6A-6C illustrate exemplary images corresponding to a disclosed method (e.g., method 400) and/or apparatus (e.g., prognostic apparatus 500) that uses a plurality of deep learning algorithms to identify GBM histopathological indicators within non-necrotic regions of a glioma.

FIG. 6A illustrates a first plurality of images 600a corresponding to a disclosed method and/or apparatus that uses a plurality of deep learning algorithms to identify GBM histopathological indicators within non-necrotic regions of a glioma.

Image 602a shows some embodiments of a digitized biopsy image (e.g., corresponding to WSI 502) comprising a digitized H&E slide. The digitized H&E slide includes tissue taken from a glioma of a patient. The H&E slide is stained with purple and pink stains. The purple stain corresponds to cellular tumor regions, while the pink stain corresponds to cytoplasmic components.

Image 604a shows some embodiments of a ground truth (e.g., corresponding to ground truth 504). The ground truth includes necrotic regions 606a, cellular tumor regions 608a, and hyperplastic blood vessel (HBV) regions 610a.

Image 612a shows some embodiments of an intermediate WSI (e.g., corresponding to intermediate WSI 512). The intermediate WSI includes necrotic regions 606a and non-necrotic regions 614a.

Image 616a shows some embodiments of a final WSI (e.g., corresponding to final WSI 520). The final WSI includes necrotic regions 606a, cellular tumor regions 608a, and HBV regions 610a. The cellular tumor regions 608a and the HBV regions 610a are within the non-necrotic regions (e.g., 614a of the intermediate WSI shown in image 612a).

FIG. 6B illustrates a second plurality of images 600b corresponding to a disclosed method and/or apparatus that uses a plurality of deep learning algorithms to identify GBM histopathological indicators within non-necrotic regions of a glioma.

Image 602b shows some embodiments of a digitized biopsy image (e.g., corresponding to WSI 502) comprising a digitized H&E slide. Image 604b shows some embodiments of a ground truth (e.g., corresponding to ground truth 504) including necrotic regions 606b, cellular tumor regions 608b, and HBV regions 610b. Image 612b shows some embodiments of an intermediate WSI (e.g., corresponding to intermediate WSI 512) including necrotic regions 606b and non-necrotic regions 614b. Image 616b shows some embodiments of a final WSI (e.g., corresponding to final WSI 520) including necrotic regions 606b, cellular tumor regions 608b, and HBV regions 610b.

FIG. 6C illustrates a third plurality of images 600c corresponding to a disclosed method and/or apparatus that uses a plurality of deep learning algorithms to identify GBM histopathological indicators within non-necrotic regions of a glioma.

Image 602c shows some embodiments of a digitized biopsy image (e.g., corresponding to WSI 502) comprising a digitized H&E slide. Image 604c shows some embodiments of a ground truth (e.g., corresponding to ground truth 504) including necrotic regions 606c, cellular tumor regions 608c, and HBV regions 610c. Image 612c shows some embodiments of an intermediate WSI (e.g., corresponding to intermediate WSI 512) including necrotic regions 606c and non-necrotic regions 614c. Image 616c shows some embodiments of a final WSI (e.g., corresponding to final WSI 520) including necrotic regions 606c, cellular tumor regions 608c, and HBV regions 610c.

Figure 7:
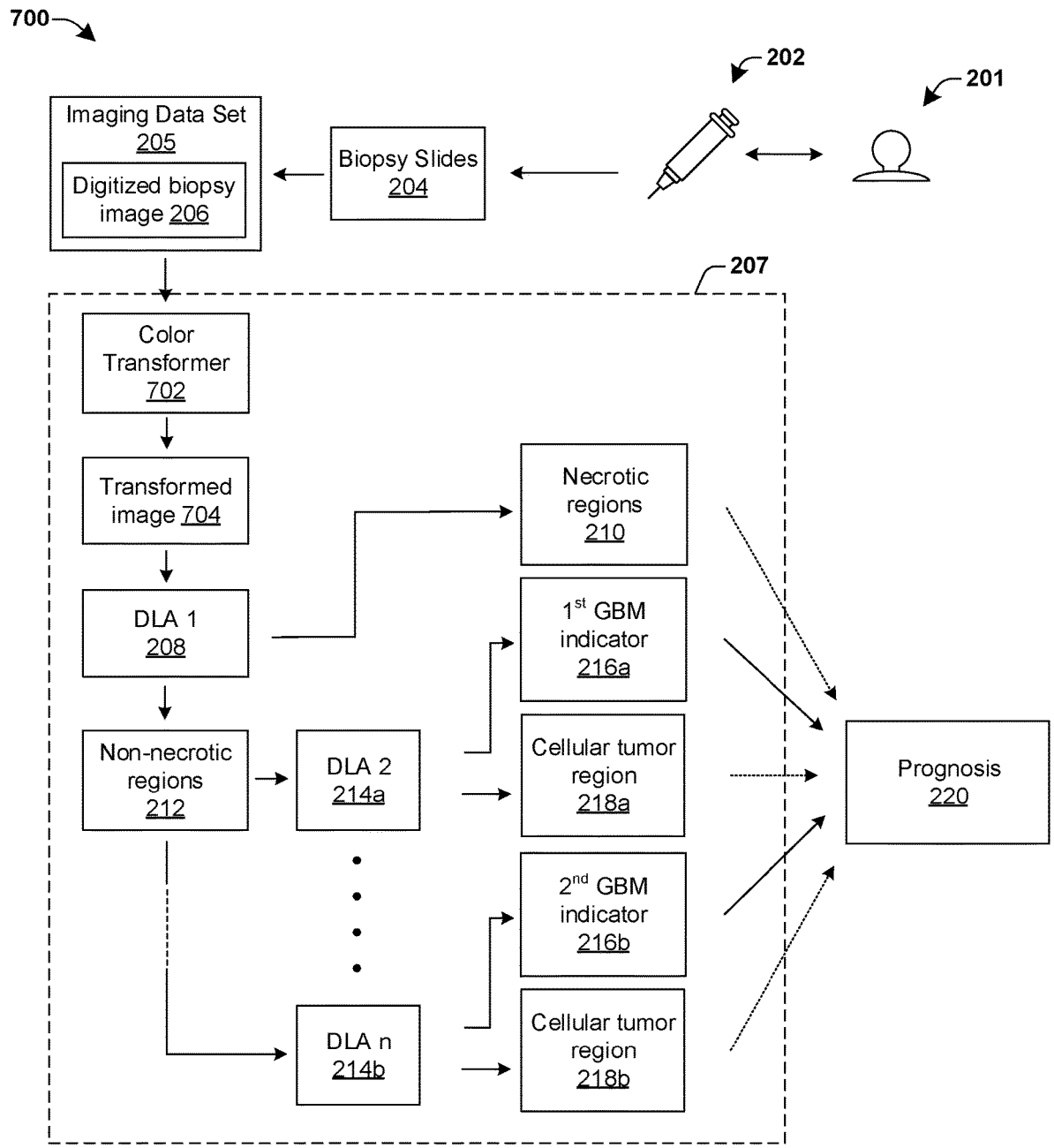
FIG. 7 illustrates a block diagram showing some additional embodiments of a disclosed prognostic apparatus and/or method that uses a deep learning system to generate a prognosis from GBM histopathological indicators.

FIG. 7 illustrates a block diagram 700 showing some additional embodiments of a disclosed prognostic apparatus comprising a deep learning system having a plurality deep learning algorithms.

As shown in block diagram 700, an imaging data set 205 is formed. The imaging data set 205 comprises a digitized biopsy image 206 of a patient 201 having a glioma. In some embodiments, the digitized biopsy image 206 may comprise multi-dimensional array data (e.g., corresponding to color images).

It has been appreciated that color consistency in histopathology is an potential issue in digitized images. For example, the staining color intensities of thicker tissue sections are stronger compared with thinner tissue sections. Therefore, in some embodiments, to alleviate poor color consistency within the imaging data set 205 the disclosed prognostic apparatus may comprise a color transformer 702 configured to map a color of the digitized biopsy image 206 to form a transformed image 704. For example, the color transformer 702 may transform the digitized biopsy image 206 from a digitized biopsy image 206 having a RGB color to a transformed image 704 having a CIELAB color space. The CIELAB color space (e.g., LAB space), expresses color as perceptual lightness (L), A and B represent chromaticity, where negative A corresponds with green, positive A corresponds with red, negative B corresponds with blue, and positive B corresponds with yellow. Mapping the color of the digitized biopsy image 206 may accentuate tissue features in the digitized biopsy image 206. For example, pseudopalisading cells and microvascular proliferation patches may be easier to classified in an L-Channel and an A-Channel, respectively. In some embodiments, after transforming the digitized biopsy image 206, every patch may be normalized by using a min-max method. Hence, the minimum value in the digitized biopsy image 206 gets transformed to 0, the maximum value is transformed to 1, and other values can be transformed to a decimal value between 0 and 1.

A deep learning system 207 comprising a plurality of deep learning algorithms 208, 214 is configured to generate a prognosis 220 from GBM histopathological indicators 216a-216b within non-necrotic regions 212 of a glioma within the transformed image 704. In some embodiments, the deep learning system 207 comprises a plurality of deep learning algorithms configured to perform hierarchical segmentation of the transformed image 704.

In some embodiments, the plurality of deep learning algorithms may comprise a first deep learning algorithm 208 configured to identify one or more necrotic regions 210a and one or more non-necrotic regions 210b within the transformed image 704. In some embodiments, the plurality of deep learning algorithms may further comprise a second deep learning algorithm 214a configured to identify a first GBM histopathological indicator 216a within the one or more non-necrotic regions 212. For example, the second deep learning algorithm 214a may be configured to identify microvascular proliferation regions within the one or more non-necrotic regions 212. In some embodiments, the plurality of deep learning algorithms may further comprise a third deep learning algorithm 214b configured to identify a second GBM histopathological indicator 216b within the one or more non-necrotic regions 212. For example, the third deep learning algorithm 214b may be configured to identify pseudopalisading cell regions within the one or more non-necrotic regions 212.

In some embodiments, the prognosis 220 is generated from at least the one or more GBM histopathological indicators 216a-216b. In some embodiments, the prognosis 220 may be generated by also taking into consideration the necrotic regions 210 and/or the cellular tumor regions 218a-218b. In various embodiments, the prognosis 220 may be generated by a health care professional or by a machine learning model.

Figure 8A:
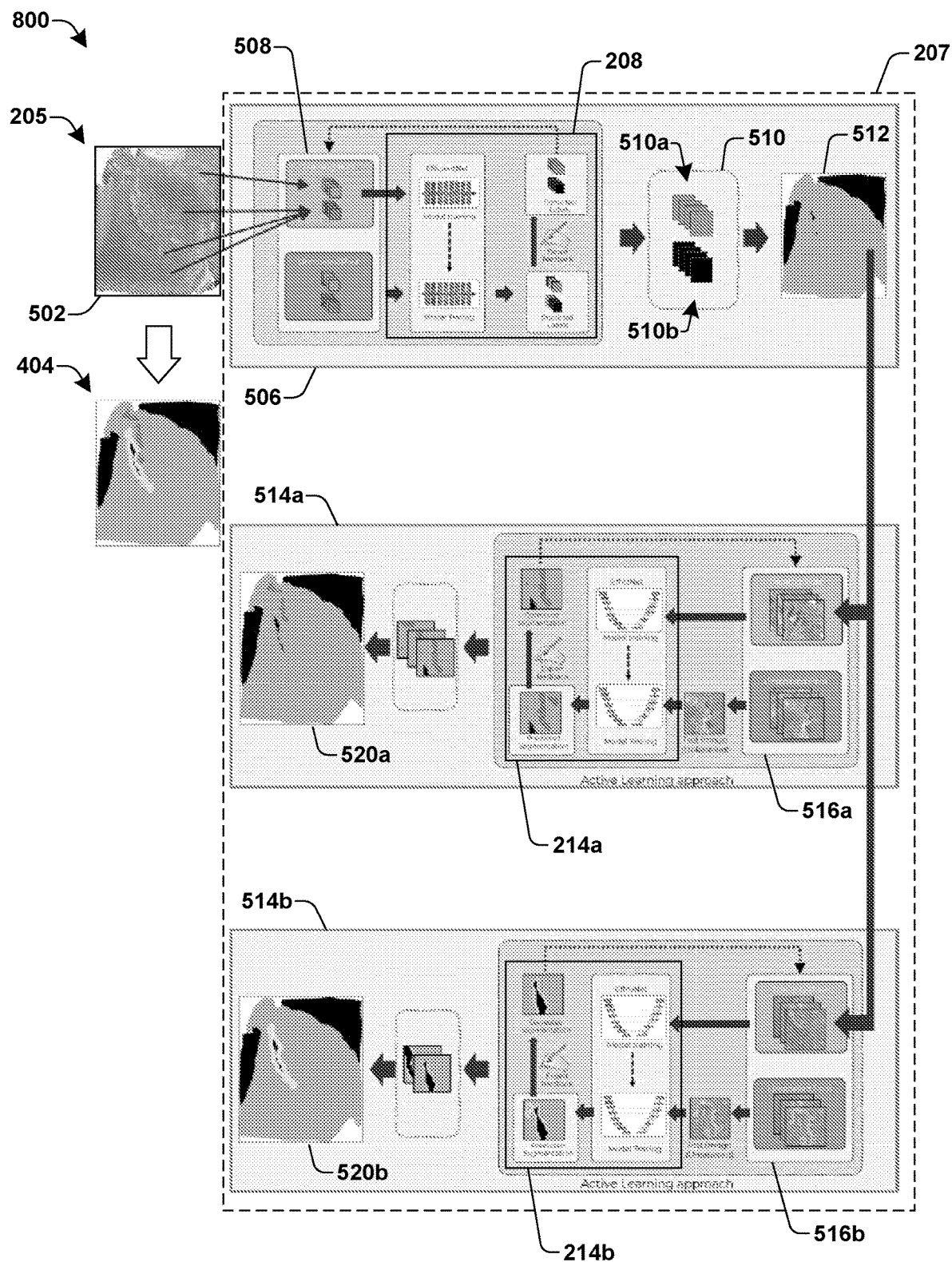
FIG. 8A illustrates a block diagram showing some additional embodiments of a disclosed prognostic apparatus comprising a deep learning system having a plurality deep learning algorithms.

FIG. 8A illustrates a block diagram showing some additional embodiments of a disclosed prognostic apparatus 800 comprising a deep learning system having a plurality deep learning algorithms.

The prognostic apparatus 800 is configured to operate upon an imaging data set 205 comprising a WSI 502 for one or more patients having a glioma. In some embodiments, the imaging data set 205 comprises both labeled images (e.g., images that have been annotated by a trained pathologist) and unlabeled images (e.g., images that have not been annotated by a trained pathologist).

The WSI 502 is provided to a deep learning system 207 having a first deep learning stage 506, a second deep learning stage 514a, and a third deep learning stage 514b. The first deep learning stage 506 comprises a first deep learning algorithm 208 configured to identify necrotic and non-necrotic regions within the WSI 502. In some embodiments, the first deep learning stage 506 is configured to sample the WSI 502 to generate a first plurality of non-overlapping patches 508. The first deep learning algorithm 208 is configured to classify each of the first plurality of non-overlapping patches 508 as a necrotic patch or a non-necrotic patch, so as to generate a first plurality of intermediate patches 510 comprising a plurality of necrotic patches 510a and a plurality of non-necrotic patches 510b. The first plurality of intermediate patches 510 are assembled to form an intermediate WSI 512 comprising non-necrotic regions.

In some embodiments, the first deep learning stage 506 may utilize active learning to improve an accuracy of the first deep learning stage 506. This is helpful for small sized data sets. In such embodiments, the labeled images are provided to the first deep learning stage 506 to train the first deep learning stage 506. The first deep learning stage 506 is then tested on unlabeled images to generate a predicted segmentation. A user is queried to provide feedback on the predicted segmentation. The feedback is provided back to the first deep learning stage 506 to improve the first deep learning stage 506.

The use of active learning improves operation of the first deep learning stage 506 to identify necrotic regions and non-necrotic regions. For example, using supervised learning, the first deep learning stage 506 may be able to distinguish necrotic regions from non-necrotic regions (e.g., identified as cellular tumor regions) with an accuracy of 0.96, a specificity of 0.91, a sensitivity of 0.98, and an accuracy of 0.98. In contrast, using active learning, the first deep learning stage 506 may be able to distinguish necrotic regions from non-necrotic regions with an accuracy of 0.98, a specificity of 0.98, a sensitivity of 0.97, and an accuracy of 0.99.

The intermediate WSI 512 is provided to the second deep learning stage 514a, which comprises a second deep learning algorithm 214a configured to identify cellular tumor regions and microvascular proliferation regions within the non-necrotic regions. In some embodiments, the second deep learning stage 514 is configured to sample the intermediate WSI 512 to generate a second plurality of non-overlapping patches 516a having a second size that is larger than the first size. The second size allows for a region surrounding a microvascular proliferation region to be taken into consideration by the second deep learning stage 514a. The second deep learning algorithm 214 is configured to individually act upon the second plurality of non-overlapping patches 516a to classify each of the second plurality of non-overlapping patches 516a as a cellular tumor patch or as a microvascular proliferation patch.

In some embodiments, the second deep learning stage 514a may utilize active learning to improve an accuracy of the second deep learning stage 514a. In such embodiments, the labeled images are provided to the second deep learning algorithm 214a to train the second deep learning algorithm 214a. The second deep learning algorithm 214a is then tested on unlabeled images to generate a predicted segmentation. A user is queried to provide feedback on the predicted segmentation. The feedback is provided back to the second deep learning algorithm 214a to improve the second deep learning algorithm 214a.

The intermediate WSI 512 is also provided to the third deep learning stage 514b, which comprises a third deep learning algorithm 214b configured to identify cellular tumor regions and pseudopalisading cells within the non-necrotic regions. In some embodiments, the third deep learning stage 514b is configured to sample the intermediate WSI 512 to generate a third plurality of non-overlapping patches 516b having a third size (e.g., patches of 896×896 pixels, or other similar values) that is larger than the first size. The third size allows for a region surrounding a pseudopalisading cell region to be taken into consideration by the third deep learning stage 514b. The third deep learning algorithm 214b is configured to individually act upon the third plurality of non-overlapping patches 516b to classify each of the third plurality of non-overlapping patches 516b as a cellular tumor patch or as pseudopalisading patch. In some embodiments, the third deep learning stage 514b may utilize active learning to improve an accuracy of the third deep learning stage 514b.

Figure 8B:
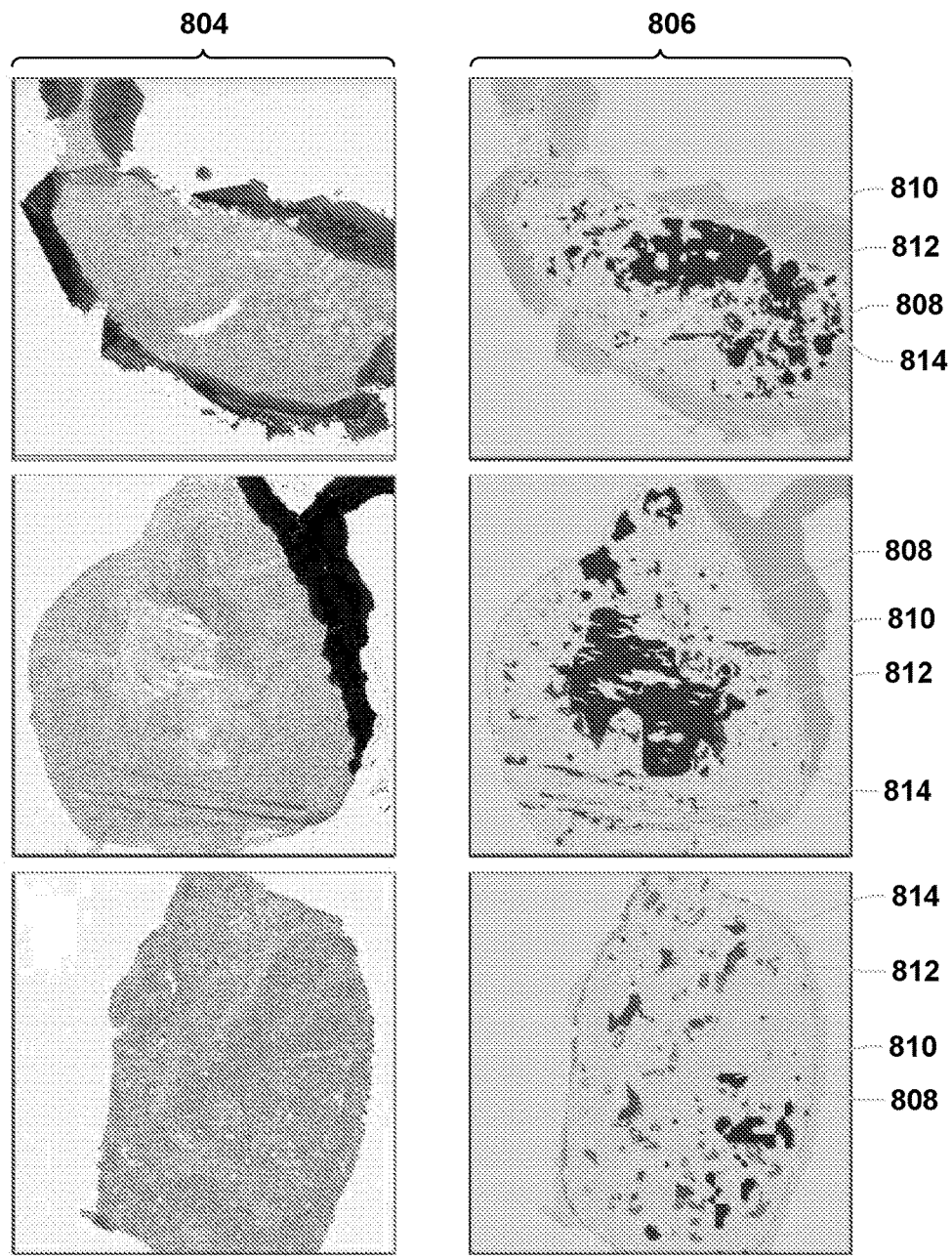
FIG. 8B illustrates a plurality of exemplary images corresponding to a disclosed method and/or apparatus that uses a plurality of deep learning algorithms to identify GBM histopathological indicators within non-necrotic regions of a glioma.

FIG. 8B illustrates a plurality of exemplary images 802 corresponding to a disclosed method and/or apparatus that uses a plurality of deep learning algorithms to identify GBM histopathological indicators within non-necrotic regions of a glioma.

Images 804 shows some embodiments of digitized biopsy images (e.g., corresponding to WSI 502) comprising a digitized H&E slide. The digitized H&E slide includes tissue taken from a glioma of a patient. The H&E slide is stained with a purple stain corresponding to cellular tumor regions and a pink stain corresponding to cytoplasmic components.

Image 806 shows some embodiments of a final WSI including necrotic regions 808, cellular tumor regions 810, microvascular proliferation regions 812, and pseudopalisading cell regions 814.

Figure 9A:
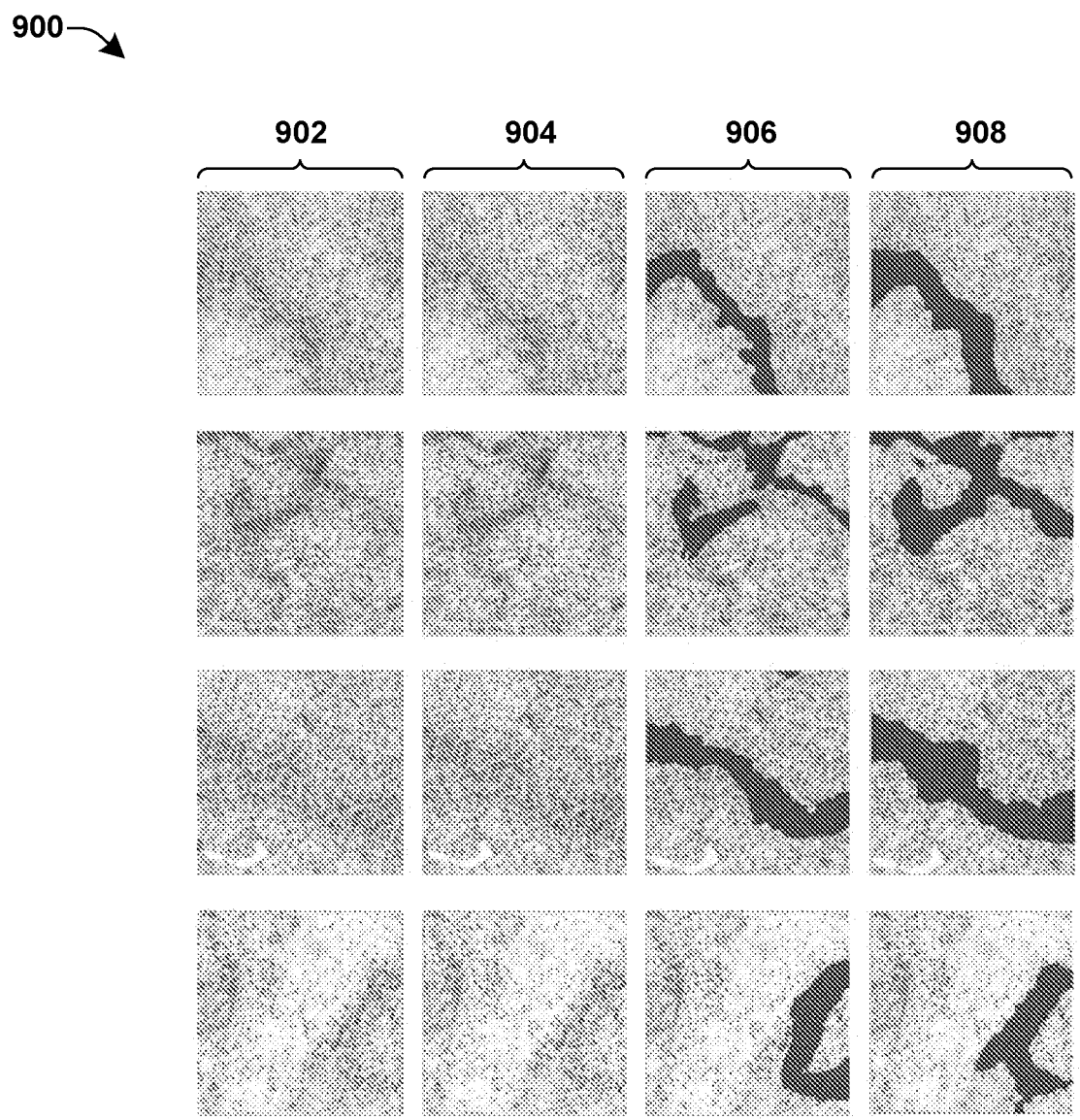
FIGS. 9A-9B illustrates exemplary images of GBM regions of interest having different color channels corresponding to a disclosed method and/or apparatus.
Figure 9B:
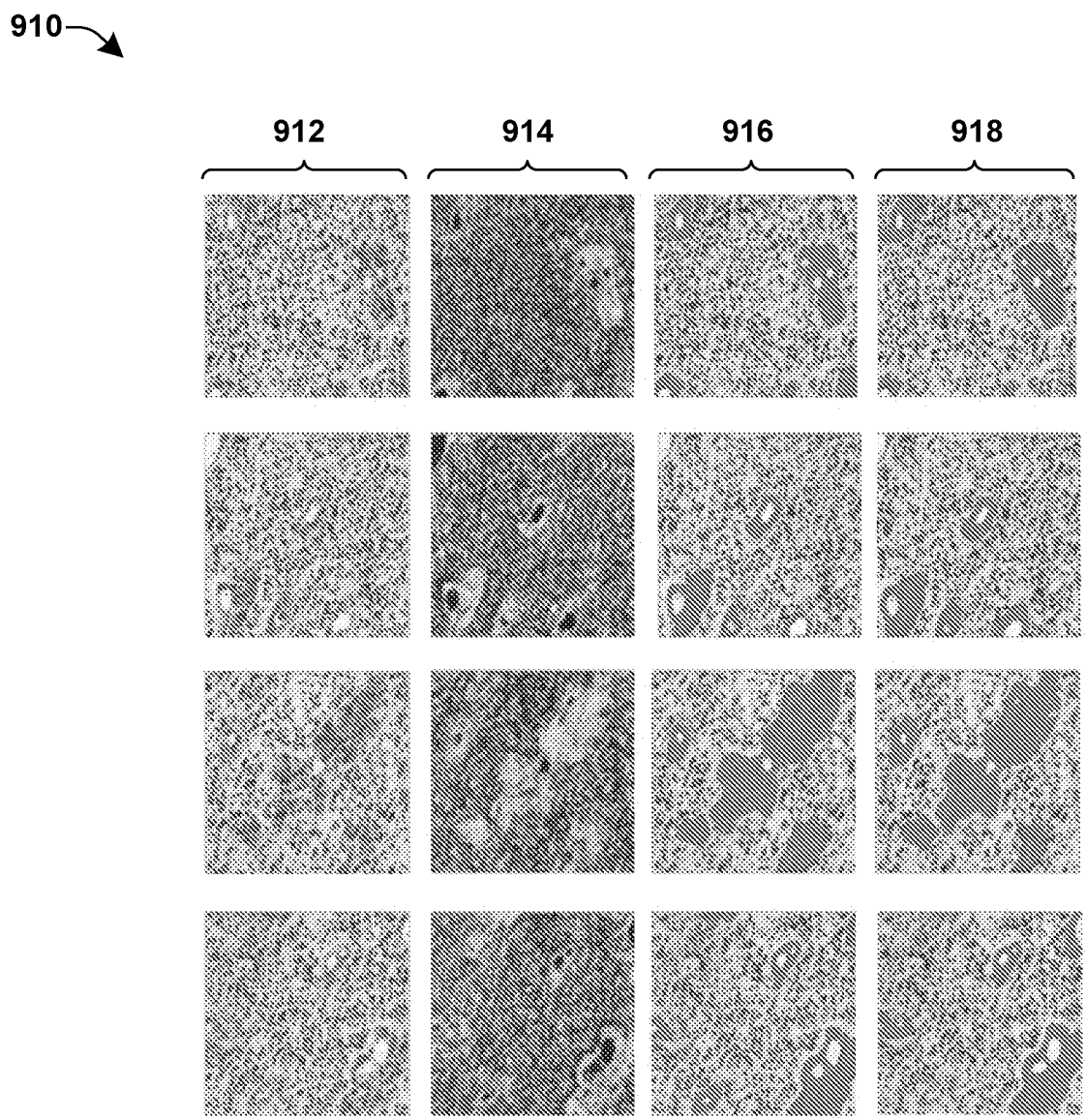

FIGS. 9A-9B illustrates exemplary images of GBM regions of interest having different color channels corresponding to a disclosed method and/or apparatus.

FIG. 9A illustrates exemplary images 900 including a first plurality of exemplary patches 902 from digitized H&E stained slides. A second plurality of exemplary patches 904 of an L-Channel corresponding to the first plurality of exemplary patches 902 of the digitized H&E stained slides are also shown. A third plurality of exemplary patches 906 corresponding to ground truths are shown overlaid onto the digitized H&E slides to show pseudopalisading cell regions. A fourth plurality of exemplary patches 908 show a prediction of pseudopalisading cell regions from a disclosed prognostic apparatus (e.g., prognostic apparatus 800) overlaid onto the digitized H&E slides. As can be seen from the third plurality of exemplary patches 906 and the fourth plurality of exemplary patches 908, there is good agreement between the ground truth and the prediction of the disclosed prognostic apparatus.

Furthermore, the combination of active learning with the use of different color channels improves operation of the second deep learning stage to cellular tumor regions and pseudopalisading cell regions. For example, the following table shows a dice score (e.g., a Dice similarity coefficient computed according to the equation $D_S(T,P)=2|T \cap P|/|T+P|$, where T and P are a number of pixels in each set) for distinguishing cellular tumor regions from pseudopalisading cell regions for disclosed deep learning systems images using H&E color images, images mapped to a CIELAB-channel L, supervised learning (SL), and active learning (AL):

| Approach | H&E | CIELAB-Channel L |
|---|---|---|
| SL | 0, 41(±0, 24) | 0, 64(±0, 16) |
| AL | 0, 42(±0, 13) | 0, 69(±0, 11) |

As can be seen in the table, the best results are achieved by a deep learning system that uses active learning on images mapped to a CIELAB-channel L.

FIG. 9B illustrates exemplary images 910 including a first plurality of exemplary patches 912 from digitized H&E stained slides. A second plurality of exemplary patches 914 of an A-Channel from the first plurality of exemplary patches 912 of the digitized H&E stained slides are also shown. A third plurality of exemplary patches 916 corresponding to ground truths are shown overlaid onto the digitized H&E slides to show microvascular proliferation regions. A fourth plurality of exemplary patches 918 show a prediction of microvascular proliferation regions from a disclosed prognostic apparatus (e.g., prognostic apparatus 800) overlaid onto the digitized H&E slides. As can be seen from the third plurality of exemplary patches 916 and the fourth plurality of exemplary patches 918, there is good agreement between the ground truth and the prediction of the disclosed prognostic apparatus.

Furthermore, the combination of active learning with the use of different color channels improves operation of the second deep learning stage to identify cellular tumor regions and microvascular proliferation regions. For example, the following table shows a dice score for distinguishing cellular tumor regions from microvascular proliferation regions for disclosed deep learning systems images using H&E color images, images mapped to a CIELAB-channel A, supervised learning (SL), and active learning (AL):

| Approach | H&E | CIELAB-Channel A |
|---|---|---|
| SL | 0, 43(±0, 25) | 0, 68 (±0, 15) |
| AL | 0, 67(±0, 15) | 0, 77(±0, 14) |

As can be seen in the table, the best results are achieved by a deep learning system that uses active learning on images mapped to a CIELAB-channel A.

Figure 10:
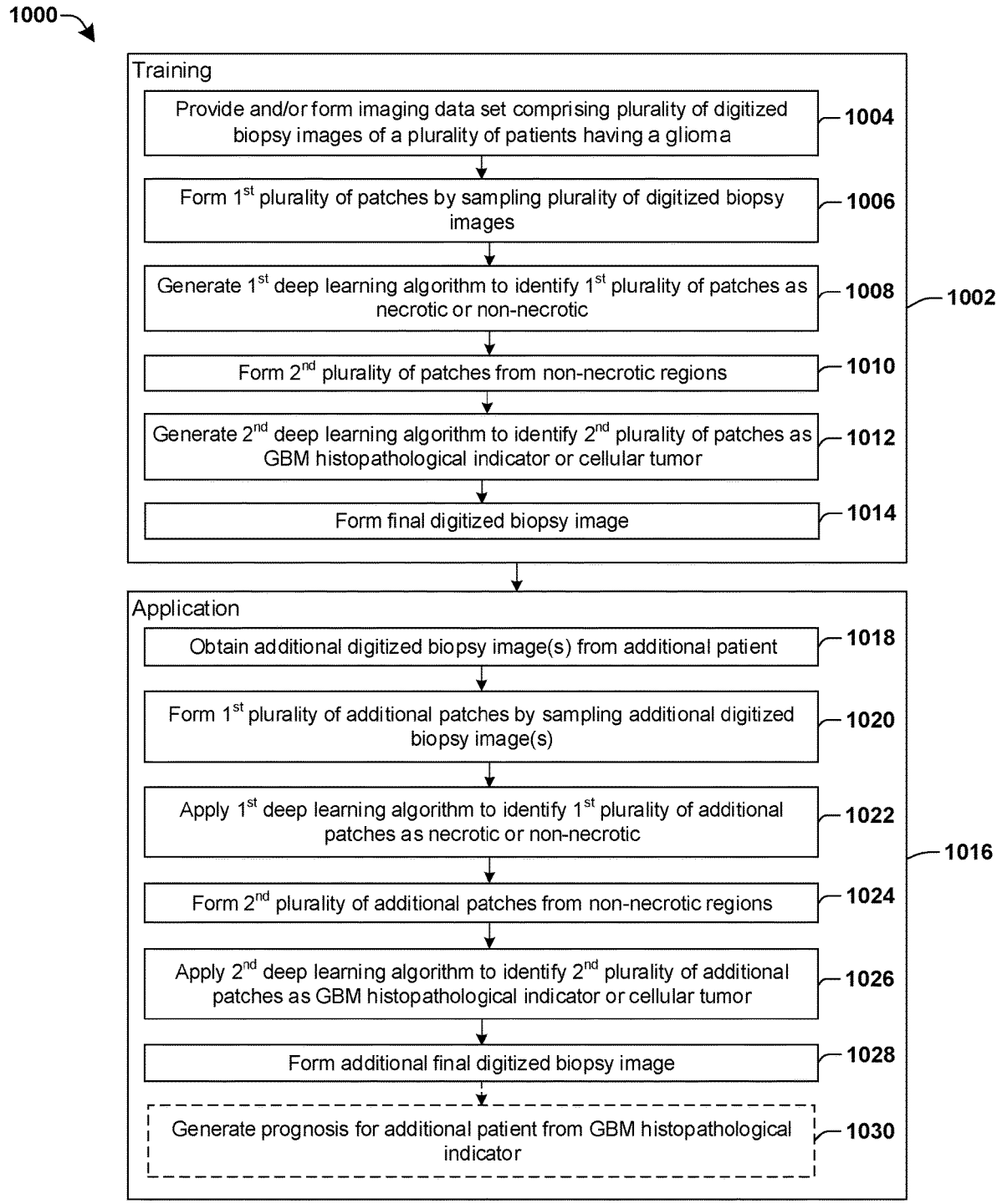
FIG. 10 illustrates a flow diagram of some additional embodiments of a method of using a plurality deep learning algorithms to generate a prognosis for a patient from GBM histopathological indicators within non-necrotic regions of a glioma.

FIG. 10 illustrates a flow diagram of some additional embodiments of a method 1000 of using a plurality deep learning algorithms to generate a prognosis for a patient from GBM histopathological indicators within non-necrotic regions of a glioma.

The method 1000 comprises a training phase 1002 and an application phase 1016. The training phase 1002 is configured to train deep learning algorithms to identify GBM histopathological indicators within non-necrotic regions of a glioma. In some embodiments, during training hyperparameters may be tuned to have a batch size of 16. An optimization algorithm and loss function Adam (e.g., learning rate of 0.001) and categorical cross-entropy, may also respectively be employed. Additionally, the training may train and validate in 200 epochs the deep learning algorithms, where performance is monitored during every epoch aiming to pick the model that reaches out the minimum value in validation loss metric. In some embodiments, the training phase 1002 may be performed according to acts 1004-1014.

At act 1004, an imaging dataset is provided and/or formed to comprise a plurality of digitized biopsy images of a plurality of patients having a glioma. In some embodiments, the imaging dataset may be formed by taking imaging data from an online database. In various embodiments, the imaging dataset may comprise images that are taken from H&E slides in frozen tissue sections and/or paraffin tissue sections. In some embodiments, the plurality of digitized biopsy images may be obtained from different institutions (e.g., different hospitals, clinics, universities, etc.).

At act 1006, a first plurality of patches are formed by sampling the plurality of digitized biopsy images with non-overlapping patches.

At act 1008, a first deep learning algorithm is generated to identify a first plurality of patches as either necrotic or non-necrotic. In some embodiments, the first plurality of patches identified as non-necrotic may be reassembled into an intermediate digitized biopsy image (e.g., intermediate WSI) having non-necrotic regions.

At act 1010, a second plurality of patches are formed from the non-necrotic regions. The intermediate digitized biopsy image may be subsequently sampled with non-overlapping patches to form the second plurality of patches.

At act 1012, a second deep learning algorithm is generated to identify the second plurality of patches as either a cellular tumor or a GBM histopathological indicator.

At act 1014, a final digitized biopsy image is generated. The final digitized biopsy image is generated from the first plurality of patches identified as necrotic, the second plurality of patches identified as a cellular tumor, and the second plurality of patches identified as a GBM histopathological indicator.

The application phase 1016 is configured to utilize the first and second deep learning algorithms that were trained in the training phase 1002 on an additional digitized biopsy image, which was taken from an additional patient. In some embodiments, the application phase 1016 may be performed according to acts 1018-1030.

At act 1018, one or more additional digitized biopsy images are obtained from an additional patient. The one or more additional digitized biopsy images are obtained by performing a biopsy (e.g., surgical resection or intra-cranial biopsies) on the additional patient to obtain a tissue block. The tissue block is sliced into thin slices that are placed on transparent slides to generate biopsy slides. The biopsy slides are subsequently converted to one or more digitized images (e.g., one or more WSIs).

At act 1020, a first plurality of additional patches are formed by sampling the one or more additional digitized biopsy images with non-overlapping patches.

At act 1022, the first deep learning algorithm is applied to the first plurality of additional patches to identify the first plurality of additional patches as either necrotic or non-necrotic. In some embodiments, the first plurality of additional patches identified as non-necrotic may be reassembled into an intermediate digitized biopsy image (e.g., intermediate WSI) having non-necrotic regions.

At act 1024, a second plurality of additional patches are formed by sampling the non-necrotic regions with non-overlapping patches.

At act 1026, a second deep learning algorithm is applied to the second plurality of additional patches to identify the second plurality of additional patches as either a cellular tumor or a GBM histopathological indicator.

At act 1028, a final digitized biopsy image is generated. The final digitized biopsy image is generated from the first plurality of additional patches identified as necrotic, the second plurality of additional patches identified as a cellular tumor, and the second plurality of additional patches identified as a GBM histopathological indicator.

At act 1030, a prognosis for the additional patient is generated from the GBM histopathological indicator.

Figure 11:
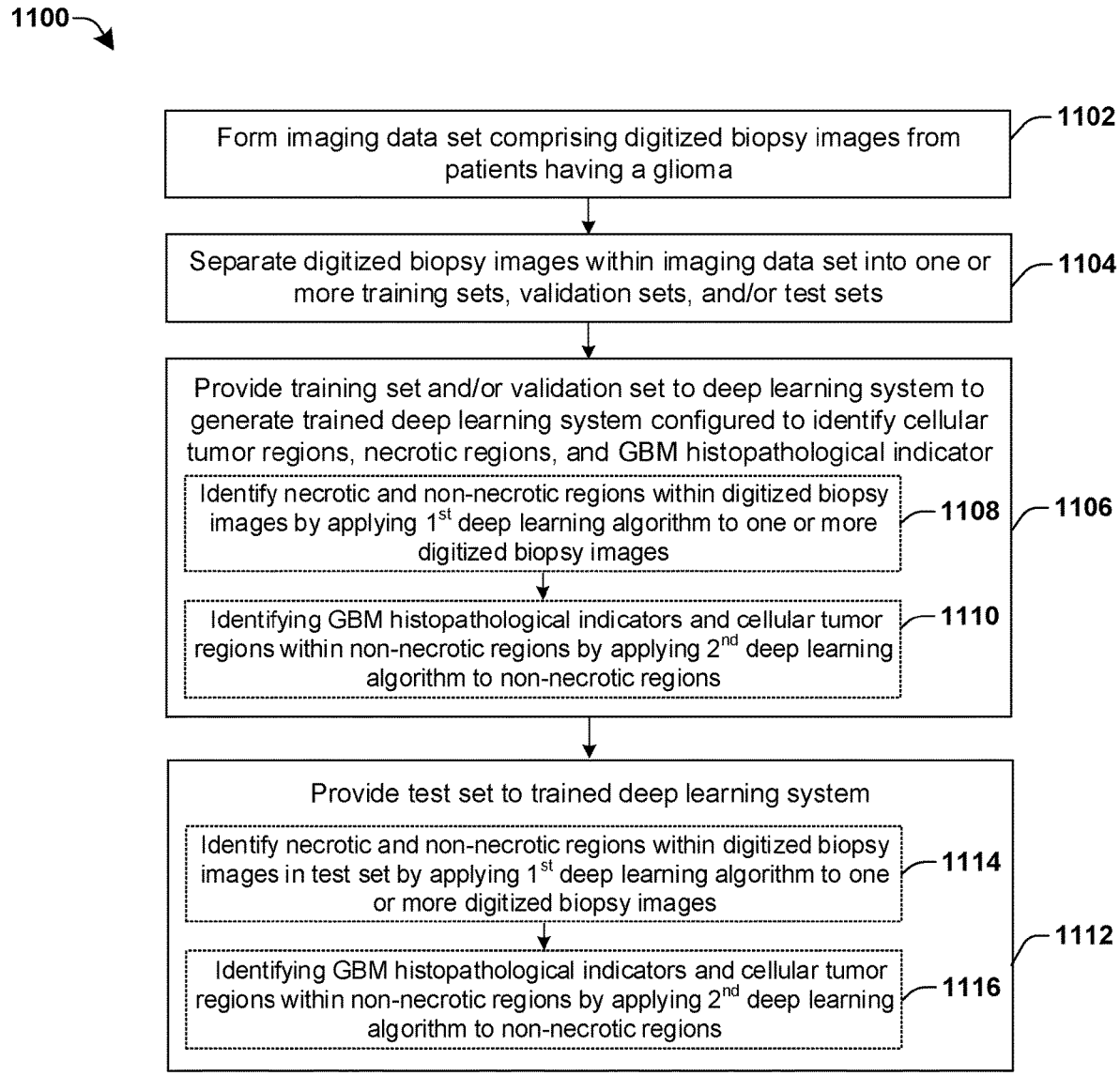
FIG. 11 illustrates a flow diagram of some embodiments of a method of generating a plurality deep learning algorithms configured to determine a prognosis for a patient having a glioma.

FIG. 11 illustrates a flow diagram of some embodiments of a method 1100 of generating a plurality deep learning algorithms configured to determine a prognosis for a patient having a glioma with training and test sets.

At act 1102, an imaging data set comprising a plurality of digitized biopsy images is provided and/or formed for a plurality of patients having a glioma. In some embodiments, the plurality of digitized biopsy images may comprise 188 slides obtained from 41 patients.

At act 1104, the plurality of digitized biopsy images within the imaging data set are be separated into one or more training sets (e.g., discovery sets), one or more validation sets, and/or one or more test sets. The one or more training sets respectively comprise a first plurality of digitized biopsy images (from the plurality of digitized biopsy images), the one or more validation sets respectively comprise a second plurality of digitized images (from the plurality of digitized biopsy images), and the one or more test sets respectively comprise a second plurality of digitized biopsy images (from the plurality of digitized biopsy images). In some embodiments, the training set may be randomly divided in a labeled sub-set and an unlabeled sub-set to enable active learning in subsequently deep learning algorithms.

In some embodiments, the plurality of digitized biopsy images may be separated in a manner that causes 120 slides from 29 patients to be placed within the one or more training sets, 38 slides from 6 patients to be placed within one or more validation sets, and 30 slides from 6 patients to be placed within one or more test sets. In some embodiments, the training set may be divided so that approximately 20% of the training set is in the labeled sub-set and approximately 80% of the training set is in the unlabeled sub-set.

At act 1106, the first plurality of digitized biopsy images within one of the one or more training sets and/or the one or more validation sets are provided to a deep learning system to generate a trained deep learning system that is configured to identify cellular tumor regions, necrotic regions, and GBM histopathology indicators (e.g., HBV regions, microvascular proliferation regions, hyperplastic blood vessel regions, or the like) within a digitized biopsy image. In some embodiments, the deep learning system may be trained according to acts 1108-1110. It will be appreciated that acts 1108-1110 may be repeated multiple times during training of the deep learning system. It will also be appreciated that acts 1108-1110 may be performed one or more times for each of the one or more training sets and/or for each of the one or more validation sets.

At act 1108, a first deep learning algorithm is applied to one or more digitized biopsy images within a training set and/or a validation set to identify necrotic and non-necrotic regions within the one or more digitized biopsy images. In some embodiments, the disclosed deep learning system may provide an accuracy of 94% for the training set in distinguishing necrotic regions from non-necrotic regions (e.g., intermediate cellular tumor regions).

At act 1110, a second deep learning algorithm is applied to the non-necrotic regions to identify cellular tumor regions and GBM histopathology indicators within the non-necrotic regions. In some embodiments, the disclosed deep learning system may provide an accuracy of 78% for the training set in identifying GBM histopathology indicators that are HBV regions.

At act 1112, the second plurality of digitized images within one of the one or more test sets are provided to the trained deep learning system to identify cellular tumor regions, necrotic regions, and GBM histopathology indicators within a digitized biopsy image. In some embodiments, the deep trained learning system may operate to identify cellular tumor regions, necrotic regions, and GBM histopathology indicators according to acts 1114-1116.

At act 1114, the first deep learning algorithm (e.g., that was trained at act 1108) is applied to one or more digitized biopsy images within the test set to identify necrotic and non-necrotic regions within the one or more digitized biopsy images. In some embodiments, the disclosed deep learning system may provide an accuracy of 88% for the test set in distinguishing necrotic regions from non-necrotic regions. In some embodiments, the disclosed deep learning system may provide an AUC of 92% for the test set in distinguishing between necrotic regions and non-necrotic regions, with a sensitivity of 91% (e.g., a proportion of cases correctly identified as necrotic regions to all necrotic regions) and a specificity of 79% (e.g., a proportion of cases corrected identified as non-necrotic regions to all non-necrotic regions).

At act 1116, the second deep learning algorithm is applied to the cellular tumor regions to identify cellular tumor regions and GBM histopathology indicators within the cellular tumor regions. In some embodiments, the disclosed deep learning system may provide an accuracy of 87% for the test set in identify HBV regions. In some embodiments, the disclosed deep learning system may provide an AUC of 94% for the test set in identify HBV regions, with a sensitivity of 89% (e.g., a proportion of cases correctly identified as HBV regions to all HBV regions) and a specificity of 83% (e.g., a proportion of cases corrected identified as non-HBV regions to all non-HBV regions).

The relatively high accuracy and AUC achieved by the disclosed deep learning system demonstrate that the disclosed deep learning system could reliably identify key histopathological attributes on biopsy slides (e.g., H&E slides) and could potentially aid pathologists in localization of regions of interests containing active and infiltrative tumor.

Figure 12:
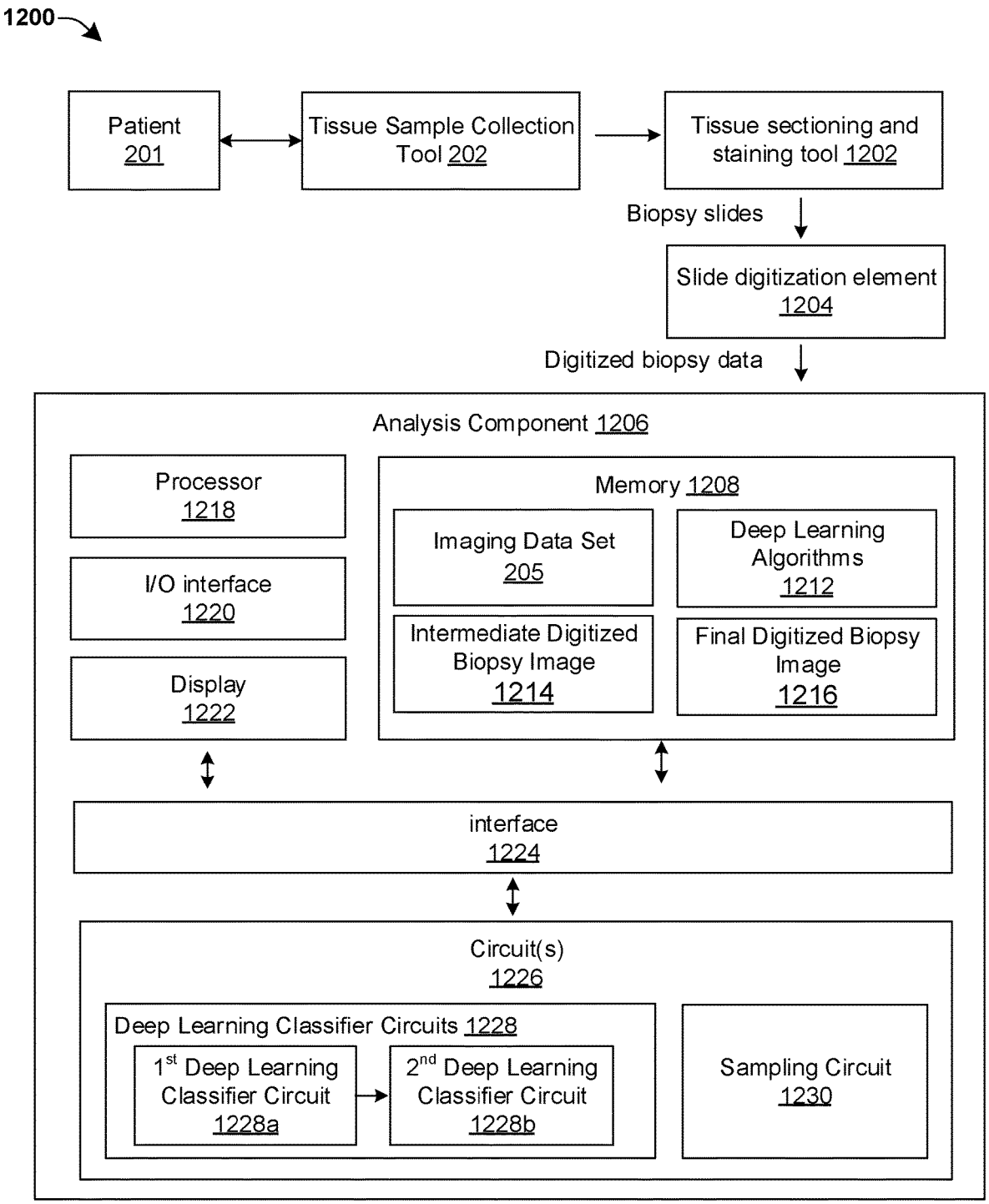
FIG. 12 illustrates a block diagram of some embodiments of a prognostic apparatus configured to utilize a plurality of deep learning algorithms to identify GBM histopathological indicators within non-necrotic regions of a glioma.

FIG. 12 illustrates a block diagram of some embodiments of a prognostic apparatus 1200 configured to utilize a disclosed deep learning system to identify GBM histopathological indicators within non-necrotic regions of a glioma.

The prognostic apparatus 1200 comprises an analysis component 1206. The analysis component 1206 is coupled to a slide digitization element 1204 that is configured to obtain digitized images (e.g., whole slide images) of tissue samples collected from a patient 201 having a glioma. In some embodiments, one or more tissue samples (e.g., a tissue block) may be obtained using a tissue sample collection tool 202 (e.g., a cannular, forceps, needle, punch, or the like). The one or more tissue samples may be provided to a tissue sectioning and staining tool 1202. In some embodiments, the tissue sectioning and staining tool 1202 may be configured to slice the one or more tissue samples into thin slices that are placed on transparent slides (e.g., glass slides) to generate biopsy slides. The tissue on the biopsy slides is then stained by applying a dye. The dye may be applied on the posterior and anterior border of the sample tissues to locate the diseased or tumorous cells or other pathological cells. The slide digitization element 1204 is configured to convert the biopsy slides to digitized biopsy data (e.g., whole slide images). In some embodiments, the slide digitization element 1204 may comprise an image sensor (e.g., a photodiode, CMOS image sensor, or the like) that is configured to capture a digital image of the biopsy slides.

The analysis component 1206 comprises a processor 1218 and a memory 1208. The processor 1218 can, in various embodiments, comprise circuitry such as, but not limited to, one or more single-core or multi-core processors. The processor 1218 can include any combination of general-purpose processors and dedicated processors (e.g., graphics processors, application processors, etc.). The processor(s) 1218 can be coupled with and/or can comprise memory (e.g., memory 1208) or storage and can be configured to execute instructions stored in the memory 1208 or storage to enable various apparatus, applications, or operating systems to perform operations and/or methods discussed herein.

Memory 1208 can be configured to store an imaging data set 205 comprising digitized images for a plurality of patients having a glioma. The digitized images may comprise digitized biopsy images having a plurality of pixels, each pixel having an associated intensity. In some additional embodiments, the digitized images may be stored in the memory 1208 as one or more training sets of digitized images, one or more test sets, and/or one or more validation sets of digitized images.

The analysis component 1206 also comprises an input/output (I/O) interface 1220 (e.g., associated with one or more I/O devices), a display 1222, one or more circuits 1226, and an interface 1224 that connects the processor 1218, the memory 1208, the I/O interface 1220, the display 1222, and the one or more circuits 1226. The I/O interface 1220 can be configured to transfer data between the memory 1208, the processor 1218, the one or more circuits 1226, and external devices.

The one or more circuits 1226 can comprise a plurality of deep learning classifier circuits 1228 (e.g., CNN segment circuits) configured to use multiple deep learning algorithms in a hierarchical segmentation approach to identify GBM histopathological indicators within the digitized images within the imaging data set 205. In some embodiments, the plurality of deep learning classifier circuits 1228 may comprise hardware components. In other embodiments, the plurality of deep learning classifier circuits 1228 may comprise software components. In some embodiments, the plurality of deep learning classifier circuits 1228 comprise a first deep learning classifier circuit 1228*a* that is configured to access the imaging data set 205. The first deep learning classifier circuit 1228*a* is configured to operate upon the digitized biopsy image with a first deep learning algorithm of a plurality of deep learning algorithms 1212 stored in the memory 1208. The first deep learning classifier circuit 1228*a* is configured to utilize the first deep learning algorithm to identify necrotic regions and non-necrotic regions (e.g., intermediate cellular tumor regions) within the digitized image. The second deep learning classifier circuit 1228*b* is configured to operate upon the non-necrotic regions with a second deep learning algorithm of the plurality of deep learning algorithms 1212 stored in the memory 1208. The second deep learning classifier circuit 1228*b* is configured to utilize the second deep learning algorithm to identify GBM histopathological indicators within the non-necrotic regions. In some embodiments, the GBM histopathological indicators may comprise one or more of microvascular proliferation regions, hyperplastic blood vessel regions, pseudopalisading cell regions, or the like.

In some embodiments, the one or more circuits 1226 may further comprise a sampling circuit 1230. The sampling circuit 1230 is configured to sample patches from a digitized image (e.g., a digitized WSI) within the imaging data set 205 to form a first plurality of patches. The first plurality of patches may be subsequently provided to the first deep learning classifier circuit 1228a. The first deep learning classifier circuit 1228a is configured to classify the first plurality of patches as either necrotic patches or non-necrotic patches, thereby identifying one or more necrotic regions and one or more non-necrotic regions within an intermediate digitized biopsy image 1214 output from the first deep learning classifier circuit 1228a and stored in the memory 1208. The sampling circuit 1230 may be further configured to sample patches from the non-necrotic regions to form a second plurality of patches. The second plurality of patches may be subsequently provided to the second deep learning classifier circuit 1228b. The second deep learning classifier circuit 1228b is configured to classify the second plurality of patches as either cellular tumor patches or GBM histopathological indicator patches, thereby identifying one or more cellular tumor regions and one or more GBM histopathological indicators within a final digitized biopsy image 1216 output from the second deep learning classifier circuit 1228b and stored in the memory 1208.

Therefore, the present disclosure provides a prognostic apparatus and/or method that uses a plurality deep learning algorithms to identify GBM histopathological indicators (e.g., microvascular proliferations, hyperplastic blood vessels, pseudopalisading cells around necrosis, and infiltrating tumors, or the like) within cellular tumor regions of a glioma.

In some embodiments, the present disclosure relates to a method for generating a prognosis, including providing one or more digitized biopsy images of a patient having a glioma; identifying one or more necrotic regions and one or more non-necrotic regions within the one or more digitized biopsy images using a first deep learning algorithm; and applying a second deep learning algorithm to the one or more non-necrotic regions to identify glioblastoma multiforme (GBM) histopathological indicators within the one or more non-necrotic regions.

In other embodiments, the present disclosure relates to a non-transitory computer-readable medium storing computer-executable instructions that, when executed, cause a processor to perform operations, including forming an imaging data set comprising a digitized biopsy image of a patient having a glioma; segmenting the digitized biopsy image using a first deep learning algorithm to identify one or more necrotic regions and one or more non-necrotic regions within the digitized biopsy image; and segmenting the non-necrotic regions using a second deep learning algorithm to identify a first glioblastoma multiforme (GBM) histopathological indicator.

In yet other embodiments, the present disclosure relates to a prognostic apparatus, including a memory configured to store an imaging data set comprising a digitized whole slide image (WSI) of a patient having a glioma; one or more deep learning classifier circuits configured to segment the digitized WSI using a first deep learning algorithm to identify one or more necrotic regions and one or more non-necrotic regions; and segment the one or more non-necrotic regions using a second deep learning algorithm to identify glioblastoma multiforme (GBM) histopathological indicators.

Examples herein can include subject matter such as an apparatus, including a digital whole slide scanner, a CT system, an MRI system, a personalized medicine system, a CADx system, a processor, a system, circuitry, a method, means for performing acts, steps, or blocks of the method, at least one machine-readable medium including executable instructions that, when performed by a machine (e.g., a processor with memory, an application-specific integrated circuit (ASIC), a field programmable gate array (FPGA), or the like) cause the machine to perform acts of the method or of an apparatus or system according to embodiments and examples described.

References to "one embodiment", "an embodiment", "one example", and "an example" indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable storage device", as used herein, refers to a device that stores instructions or data. "Computer-readable storage device" does not refer to propagated signals. A computer-readable storage device may take forms, including, but not limited to, non-volatile media, and volatile media. Non-volatile media may include, for example, optical disks, magnetic disks, tapes, and other media. Volatile media may include, for example, semiconductor memories, dynamic memory, and other media. Common forms of a computer-readable storage device may include, but are not limited to, a floppy disk, a flexible disk, a hard disk, a magnetic tape, other magnetic medium, an application specific integrated circuit (ASIC), a compact disk (CD), other optical medium, a random access memory (RAM), a read only memory (ROM), a memory chip or card, a memory stick, and other media from which a computer, a processor or other electronic device can read.

"Circuit", as used herein, includes but is not limited to hardware, firmware, software in execution on a machine, or combinations of each to perform a function(s) or an action(s), or to cause a function or action from another logic, method, or system. A circuit may include a software controlled microprocessor, a discrete logic (e.g., ASIC), an analog circuit, a digital circuit, a programmed logic device, a memory device containing instructions, and other physical devices. A circuit may include one or more gates, combinations of gates, or other circuit components. Where multiple logical circuits are described, it may be possible to incorporate the multiple logical circuits into one physical circuit. Similarly, where a single logical circuit is described, it may be possible to distribute that single logical circuit between multiple physical circuits.

To the extent that the term "includes" or "including" is employed in the detailed description or the claims, it is intended to be inclusive in a manner similar to the term "comprising" as that term is interpreted when employed as a transitional word in a claim.

Throughout this specification and the claims that follow, unless the context requires otherwise, the words 'comprise' and 'include' and variations such as 'comprising' and 'including' will be understood to be terms of inclusion and not exclusion. For example, when such terms are used to refer to a stated integer or group of integers, such terms do not imply the exclusion of any other integer or group of integers.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1996). While example systems, methods, and other embodiments have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and other embodiments described herein. Therefore, the invention is not limited to the specific details, the representative apparatus, and illustrative examples shown and described. Thus, this application is intended to embrace alterations, modifications, and variations that fall within the scope of the appended claims.

What is claimed is:

1. A method, comprising:
providing one or more digitized biopsy images of a patient having a glioma;
sampling a first plurality of patches from the one or more digitized biopsy images;
providing the first plurality of patches to a first deep learning algorithm, wherein the first deep learning algorithm is configured to identify one or more necrotic regions and one or more non-necrotic regions by identifying the first plurality of patches as necrotic patches or non-necrotic patches;
sampling a second plurality of patches from the one or more non-necrotic regions; and
providing the second plurality of patches to a second deep learning algorithm, wherein the second deep learning algorithm is configured to identify glioblastoma multiforme (GBM) histopathological indicators within the one or more non-necrotic regions by identifying the second plurality of patches as GBM histopathological indicator patches or cellular tumor patches.

2. The method of claim 1, further comprising:
generating a prognosis for the patient from at least the GBM histopathological indicators.

3. The method of claim 1, wherein the GBM histopathological indicators comprise one or more of microvascular proliferation regions, hyperplastic blood vessel regions, and pseudopalisading cell regions.

4. The method of claim 1, further comprising:
sampling non-overlapping patches from the one or more digitized biopsy images to form the first plurality of patches;
discarding one or more of the first plurality of patches that fail to meet a selection criteria;
augmenting data within the first plurality of patches after discarding one or more of the first plurality of patches; and
providing the first plurality of patches to the first deep learning algorithm after augmenting the data within the first plurality of patches.

5. The method of claim 4, wherein augmenting the data within the first plurality of patches comprises performing one or more of horizontal flips, vertical flips, random shifts, color transformations, and random rotations on the first plurality of patches.

6. The method of claim 1, further comprising:
transforming a color of the one or more digitized biopsy images from an RGB color to a CIELAB color space prior to providing the one or more digitized biopsy images to the first deep learning algorithm.

7. The method of claim 1, wherein the first plurality of patches respectively have a first size and the second plurality of patches respectively have a second size that is larger than the first size.

8. A non-transitory computer-readable medium storing computer-executable instructions that, when executed, cause a processor to perform operations, comprising:
forming an imaging data set comprising a digitized biopsy image of a patient having a glioma;
sampling a first plurality of patches from the digitized biopsy image;
segmenting the digitized biopsy image by operating upon the first plurality of patches using a first deep learning algorithm to form a plurality of intermediate patches that identify one or more necrotic regions and one or more non-necrotic regions within the digitized biopsy image;
reassembling the plurality of intermediate patches to form an intermediate digitized biopsy image comprising the one or more non-necrotic regions;
sampling a second plurality of patches from the intermediate digitized biopsy image; and
segmenting the one or more non-necrotic regions by operating upon the second plurality of patches using a second deep learning algorithm to identify the second plurality of patches as GBM histopathological indicator patches comprising a first glioblastoma multiforme (GBM) histopathological indicator or cellular tumor patches.

9. The non-transitory computer-readable medium of claim 8, further comprising:
mapping a color of the digitized biopsy image from an RGB color to a CIELAB color space prior to providing the digitized biopsy image to the first deep learning algorithm.

10. The non-transitory computer-readable medium of claim 8, further comprising:
transforming a color of the digitized biopsy image from an RGB color to an L-Channel of a CIELAB color space, wherein the first GBM histopathological indicator is a pseudopalisading cell region; or
transforming the color of the digitized biopsy image from the RGB color to an A-Channel of the CIELAB color space, wherein the first GBM histopathological indicator is a microvascular proliferation region.

11. The non-transitory computer-readable medium of claim 8, further comprising:
segmenting the non-necrotic regions using a third deep learning algorithm to identify a second GBM histopathological indicator, the second GBM histopathological indicator being different than the first GBM histopathological indicator.

12. The non-transitory computer-readable medium of claim 11,
wherein the first GBM histopathological indicator and the second GBM histopathological indicator are respectively a microvascular proliferation region, a hyperplastic blood vessel region, or a pseudopalisading cell region.

13. The non-transitory computer-readable medium of claim 8, wherein the first plurality of patches respectively have a first size and the second plurality of patches respectively have a second size that is larger than the first size.

14. The non-transitory computer-readable medium of claim 8, wherein the second plurality of patches comprise a region surrounding one or more of the GBM histopathological indicators.

15. A prognostic apparatus, comprising:
a memory configured to store an imaging data set comprising a digitized whole slide image (WSI) of a patient having a glioma;
one or more deep learning classifier circuits configured to:
segment the digitized WSI using a first deep learning algorithm to identify one or more necrotic regions and one or more non-necrotic regions; and
segment the one or more non-necrotic regions using a second deep learning algorithm to identify glioblastoma multiforme (GBM) histopathological indicators; and
a sampling circuit configured to:
sample a first plurality of patches from the WSI, wherein the first plurality of patches are provided to the first deep learning algorithm to identify the one or more necrotic regions and the one or more non-necrotic regions; and
sample a second plurality of patches from the non-necrotic regions, wherein the second plurality of patches are provided to the second deep learning algorithm to identify the GBM histopathological indicators and the one or more non-necrotic regions.

16. The prognostic apparatus of claim 15, wherein the first plurality of patches respectively have a first size and the second plurality of patches respectively have a second size that is larger than the first size.

17. The method of claim 1, further comprising:
taking a tissue sample from the patient; and
digitizing one or more slices of the tissue sample to generate the one or more digitized biopsy images.

18. The non-transitory computer-readable medium of claim 8, wherein the GBM histopathological indicator patches comprise a hyperplastic blood vessel.

19. The prognostic apparatus of claim 15, wherein the non-necrotic regions comprise cellular tumor regions.

20. The prognostic apparatus of claim 15, wherein the digitized WSI comprises a digitized H&E stained tissue slide.

* * * * *